US009824355B2

(12) United States Patent
Aabye et al.

(10) Patent No.: US 9,824,355 B2
(45) Date of Patent: Nov. 21, 2017

(54) METHOD OF PERFORMING TRANSACTIONS WITH CONTACTLESS PAYMENT DEVICES USING PRE-TAP AND TWO-TAP OPERATIONS

(75) Inventors: Christian Aabye, Foster City, CA (US); Hao Ngo, San Jose, CA (US); David Wilson, Camberley (GB)

(73) Assignee: Visa International Service Association, San Francisco, CA (US)

( * ) Notice: Subject to any disclaimer, the term of this patent is extended or adjusted under 35 U.S.C. 154(b) by 727 days.

(21) Appl. No.: 12/563,444

(22) Filed: Sep. 21, 2009

(65) Prior Publication Data

US 2010/0211504 A1    Aug. 19, 2010

Related U.S. Application Data

(60) Provisional application No. 61/099,060, filed on Sep. 22, 2008.

(51) Int. Cl.
*G06Q 40/00* (2012.01)
*G06Q 20/40* (2012.01)
(Continued)

(52) U.S. Cl.
CPC ............ *G06Q 20/40* (2013.01); *G06Q 20/10* (2013.01); *G06Q 20/20* (2013.01); *G06Q 20/204* (2013.01);
(Continued)

(58) Field of Classification Search
USPC ...................................... 705/35–40; 455/558
See application file for complete search history.

(56) References Cited

U.S. PATENT DOCUMENTS

| 4,044,231 A | 8/1977 | Beck et al. |
| 4,613,904 A | 9/1986 | Lurie |

(Continued)

FOREIGN PATENT DOCUMENTS

| AU | 2009292926 | 3/2010 |
| AU | 2009292926 | 4/2015 |

(Continued)

OTHER PUBLICATIONS

Supplementary European Search Report dated Feb. 29, 2012 in EP 09 81 5372, 6 pages.

(Continued)

*Primary Examiner* — Bruce I Ebersman
*Assistant Examiner* — John Anderson
(74) *Attorney, Agent, or Firm* — Kilpatrick Townsend & Stockton LLP

(57) ABSTRACT

A system, apparatus, and method for processing payment transactions that are conducted using a mobile payment device that includes a contactless element, such as an integrated circuit chip. The invention enables one or more of the operations of activation of a payment application, transfer of transaction data, updating of account records, setting or re-setting of a payment application counter or register, or transfer or processing of a script, command, or instruction, with these functions being performed with minimal impact on a consumer. This is accomplished by introducing a pre-tap and/or two-tap operation prior to, or as part of, the transaction flow.

17 Claims, 6 Drawing Sheets

(51) Int. Cl.
*G06Q 20/10* (2012.01)
*G06Q 20/20* (2012.01)
*G06Q 20/32* (2012.01)
*G06Q 20/38* (2012.01)

(52) U.S. Cl.
CPC ....... *G06Q 20/322* (2013.01); *G06Q 20/3278* (2013.01); *G06Q 20/382* (2013.01); *G06Q 20/3829* (2013.01)

(56) References Cited

U.S. PATENT DOCUMENTS

| | | |
|---|---|---|
| 4,614,861 A | 9/1986 | Pavlov et al. |
| 4,674,041 A | 6/1987 | Lemon et al. |
| 4,701,601 A | 10/1987 | Francini et al. |
| 4,868,376 A | 9/1989 | Lessin et al. |
| 5,034,597 A | 7/1991 | Atsumi et al. |
| 5,305,196 A | 4/1994 | Deaton et al. |
| 5,327,508 A | 7/1994 | Deaton et al. |
| 5,353,218 A | 10/1994 | De Lapa et al. |
| 5,359,183 A | 10/1994 | Skodlar |
| 5,388,165 A | 2/1995 | Deaton et al. |
| RE34,915 E | 4/1995 | Nichtberger et al. |
| 5,420,606 A | 5/1995 | Begum et al. |
| 5,430,644 A | 7/1995 | Deaton et al. |
| 5,448,471 A | 9/1995 | Deaton et al. |
| 5,465,206 A | 11/1995 | Hilt et al. |
| 5,477,038 A | 12/1995 | Levine et al. |
| 5,483,444 A | 1/1996 | Heintzeman et al. |
| 5,500,513 A | 3/1996 | Langhans et al. |
| 5,502,636 A | 3/1996 | Clarke |
| 5,530,438 A | 6/1996 | Bickham et al. |
| 5,564,073 A | 10/1996 | Takahisa |
| 5,577,266 A | 11/1996 | Takahisa et al. |
| 5,579,537 A | 11/1996 | Takahisa |
| 5,592,560 A | 1/1997 | Deaton et al. |
| 5,604,921 A | 2/1997 | Alanara |
| 5,615,110 A | 3/1997 | Wong |
| 5,621,201 A | 4/1997 | Langhans et al. |
| 5,621,812 A | 4/1997 | Deaton et al. |
| 5,627,549 A | 5/1997 | Park |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,659,165 A | 8/1997 | Jennings et al. |
| 5,659,469 A | 8/1997 | Deaton et al. |
| 5,675,662 A | 10/1997 | Deaton et al. |
| 5,678,939 A | 10/1997 | Ross |
| 5,687,322 A | 11/1997 | Deaton et al. |
| 5,708,422 A | 1/1998 | Blonder et al. |
| 5,710,886 A | 1/1998 | Christensen et al. |
| 5,717,866 A | 2/1998 | Naftzger |
| 5,761,648 A | 6/1998 | Golden et al. |
| 5,777,903 A | 7/1998 | Piosenka et al. |
| 5,791,991 A | 8/1998 | Small |
| 5,793,972 A | 8/1998 | Shane |
| 5,806,044 A | 9/1998 | Powell |
| 5,822,735 A | 10/1998 | De Lapa et al. |
| 5,855,007 A | 12/1998 | Jovicic et al. |
| 5,870,030 A | 2/1999 | DeLuca et al. |
| 5,884,277 A | 3/1999 | Khosla |
| 5,905,246 A | 5/1999 | Fajkowski |
| 5,907,830 A | 5/1999 | Engel et al. |
| 5,924,080 A | 7/1999 | Johnson |
| 5,945,653 A | 8/1999 | Walker et al. |
| 5,959,577 A | 9/1999 | Fan et al. |
| 5,974,399 A | 10/1999 | Giuliani et al. |
| 5,991,749 A | 11/1999 | Morrill, Jr. |
| 6,002,771 A | 12/1999 | Nielsen |
| 6,009,411 A | 12/1999 | Kepecs |
| 6,009,415 A | 12/1999 | Shurling et al. |
| 6,012,038 A | 1/2000 | Powell |
| 6,014,634 A | 1/2000 | Scroggie et al. |
| 6,018,718 A | 1/2000 | Walker et al. |
| 6,029,151 A | 2/2000 | Nikander |
| 6,035,280 A | 3/2000 | Christensen |
| 6,041,309 A | 3/2000 | Laor |
| 6,049,778 A | 4/2000 | Walker et al. |
| 6,055,505 A | 4/2000 | Elston |
| 6,062,472 A | 5/2000 | Cheung |
| 6,062,991 A | 5/2000 | Moriarty et al. |
| 6,064,990 A | 5/2000 | Goldsmith |
| 6,067,526 A | 5/2000 | Powell |
| 6,067,529 A | 5/2000 | Ray et al. |
| 6,076,068 A | 6/2000 | DeLapa et al. |
| 6,076,069 A | 6/2000 | Laor |
| 6,076,101 A | 6/2000 | Kamakura et al. |
| 6,128,599 A | 10/2000 | Walker et al. |
| 6,185,290 B1 | 2/2001 | Shaffer et al. |
| 6,185,541 B1 | 2/2001 | Scroggie et al. |
| 6,227,447 B1 | 5/2001 | Campisano |
| 6,237,145 B1 | 5/2001 | Narasimhan et al. |
| 6,247,129 B1 | 6/2001 | Keathley et al. |
| 6,267,292 B1 | 7/2001 | Walker et al. |
| 6,279,112 B1 | 8/2001 | O'Toole, Jr. et al. |
| 6,292,786 B1 | 9/2001 | Deaton et al. |
| 6,307,958 B1 | 10/2001 | Deaton et al. |
| 6,318,631 B1 | 11/2001 | Halperin |
| 6,321,208 B1 | 11/2001 | Barnett et al. |
| 6,330,543 B1 | 12/2001 | Kepecs |
| 6,330,550 B1 | 12/2001 | Brisebois et al. |
| 6,334,108 B1 | 12/2001 | Deaton et al. |
| 6,336,098 B1 | 1/2002 | Fortenberry et al. |
| 6,336,099 B1 | 1/2002 | Barnett et al. |
| 6,341,724 B2 | 1/2002 | Campisano |
| 6,351,735 B1 | 2/2002 | Deaton et al. |
| 6,377,935 B1 | 4/2002 | Deaton et al. |
| 6,378,775 B2 | 4/2002 | Hayashida |
| 6,381,324 B1 | 4/2002 | Shaffer et al. |
| 6,424,949 B1 | 7/2002 | Deaton et al. |
| 6,424,951 B1 | 7/2002 | Shurling et al. |
| 6,434,534 B1 | 8/2002 | Walker et al. |
| 6,470,181 B1 | 10/2002 | Maxwell |
| 6,484,146 B2 | 11/2002 | Day et al. |
| 6,488,203 B1 | 12/2002 | Stoutenburg et al. |
| 6,505,046 B1 | 1/2003 | Baker |
| 6,516,302 B1 | 2/2003 | Deaton et al. |
| 6,529,725 B1 | 3/2003 | Joao et al. |
| 6,535,855 B1 | 3/2003 | Cahill et al. |
| 6,557,752 B1 | 5/2003 | Yacoob |
| 6,560,581 B1 | 5/2003 | Fox et al. |
| 6,584,309 B1 | 6/2003 | Whigham |
| 6,587,835 B1 | 7/2003 | Treyz et al. |
| 6,601,040 B1 | 7/2003 | Kolls |
| 6,601,759 B2 | 8/2003 | Fife et al. |
| 6,609,104 B1 | 8/2003 | Deaton et al. |
| 6,611,811 B1 | 8/2003 | Deaton et al. |
| 6,631,849 B2 | 10/2003 | Blossom |
| 6,647,257 B2 | 11/2003 | Owensby |
| 6,647,269 B2 | 11/2003 | Hendrey et al. |
| 6,664,948 B2 | 12/2003 | Crane et al. |
| 6,684,195 B1 | 1/2004 | Deaton et al. |
| 6,685,093 B2 | 2/2004 | Challa et al. |
| 6,736,322 B2 | 5/2004 | Gobburu et al. |
| 6,747,547 B2 | 6/2004 | Benson |
| 6,775,539 B2 | 8/2004 | Deshpande |
| 6,832,721 B2 | 12/2004 | Fujii |
| 6,837,425 B2 | 1/2005 | Gauthier et al. |
| 6,868,391 B1 | 3/2005 | Hultgren |
| 6,877,665 B2 | 4/2005 | Challa et al. |
| 6,912,398 B1 | 6/2005 | Domnitz |
| 6,920,611 B1 | 7/2005 | Spaeth et al. |
| 6,934,689 B1 | 8/2005 | Ritter et al. |
| 6,965,992 B1 | 11/2005 | Joseph et al. |
| 6,975,852 B1 | 12/2005 | Sofer et al. |
| 6,990,330 B2 | 1/2006 | Veerepalli et al. |
| 7,003,497 B2 | 2/2006 | Maes |
| 7,007,840 B2 | 3/2006 | Davis |
| 7,013,286 B1 | 3/2006 | Aggarwal et al. |
| 7,025,256 B1 | 4/2006 | Drummond et al. |
| 7,028,906 B2 | 4/2006 | Challa et al. |
| 7,039,611 B2 | 5/2006 | Devine |
| 7,040,533 B1 | 5/2006 | Ramachandran |

(56) References Cited

U.S. PATENT DOCUMENTS

| | | | |
|---|---|---|---|
| 7,051,923 B2 | 5/2006 | Nguyen et al. |
| 7,055,031 B2 | 5/2006 | Platt |
| 7,076,329 B1 | 7/2006 | Kolls |
| 7,089,208 B1 | 8/2006 | Levchin et al. |
| 7,099,850 B1 | 8/2006 | Mann et al. |
| 7,104,446 B2 | 9/2006 | Bortolin et al. |
| 7,107,250 B2 | 9/2006 | Harrison |
| 7,110,954 B2 | 9/2006 | Yung et al. |
| 7,121,456 B2 | 10/2006 | Spaeth et al. |
| 7,124,937 B2 | 10/2006 | Myers et al. |
| 7,136,835 B1 | 11/2006 | Flitcroft et al. |
| 7,150,393 B1 | 12/2006 | Drummond et al. |
| 7,152,780 B2 | 12/2006 | Gauthier et al. |
| 7,159,770 B2 | 1/2007 | Onozu |
| 7,194,437 B1 | 3/2007 | Britto et al. |
| 7,201,313 B1 | 4/2007 | Ramachandran |
| 7,203,300 B2 | 4/2007 | Shaffer et al. |
| 7,207,477 B1 | 4/2007 | Ramachandran |
| 7,231,357 B1 | 6/2007 | Shanman |
| 7,231,372 B1 | 6/2007 | Prange et al. |
| RE39,736 E | 7/2007 | Morrill, Jr. |
| 7,243,853 B1 | 7/2007 | Levy et al. |
| 7,257,545 B1 | 8/2007 | Hung |
| 7,280,981 B2 | 10/2007 | Huang et al. |
| 7,290,704 B1 | 11/2007 | Ball et al. |
| 7,308,254 B1 | 12/2007 | Rissanen |
| 7,343,149 B2 | 3/2008 | Benco et al. |
| 7,350,702 B2 | 4/2008 | Bortolin et al. |
| 7,353,187 B1 | 4/2008 | Emodi et al. |
| 7,356,516 B2 | 4/2008 | Richey et al. |
| 7,357,310 B2 | 4/2008 | Calabrese et al. |
| 7,407,094 B2 | 8/2008 | Myers et al. |
| 7,440,771 B2 | 10/2008 | Purk |
| 7,447,662 B2 | 11/2008 | Gibson |
| 7,464,867 B1 | 12/2008 | Kolls |
| 7,496,527 B2 | 2/2009 | Silverstein et al. |
| 7,500,606 B2 | 3/2009 | Park et al. |
| 7,580,873 B1 | 8/2009 | Silver et al. |
| 7,631,803 B2 | 12/2009 | Peyret et al. |
| 7,716,129 B1 | 5/2010 | Tan et al. |
| 7,945,240 B1 | 5/2011 | Klock et al. |
| 7,970,669 B1 | 6/2011 | Santos |
| 7,992,781 B2 | 8/2011 | Hammad |
| 8,019,365 B2 | 9/2011 | Fisher |
| 8,135,362 B2 | 3/2012 | LaDue |
| 8,170,527 B2 | 5/2012 | Granucci et al. |
| 8,977,567 B2 | 3/2015 | Aabye et al. |
| 2001/0013542 A1 | 8/2001 | Horowitz et al. |
| 2002/0013711 A1 | 1/2002 | Ahuja et al. |
| 2002/0065713 A1 | 5/2002 | Awada et al. |
| 2002/0073025 A1 | 6/2002 | Tanner et al. |
| 2002/0091569 A1 | 7/2002 | Kitaura et al. |
| 2002/0128903 A1 | 9/2002 | Kernahan |
| 2002/0161701 A1 | 10/2002 | Warmack |
| 2002/0165775 A1 | 11/2002 | Tagseth et al. |
| 2002/0190118 A1 | 12/2002 | Davenport et al. |
| 2002/0198777 A1 | 12/2002 | Yuasa |
| 2003/0004808 A1 | 1/2003 | Elhaoussine |
| 2003/0058261 A1 | 3/2003 | Challa et al. |
| 2003/0120593 A1 | 6/2003 | Bansal et al. |
| 2003/0126078 A1 | 7/2003 | Vihinen |
| 2003/0144907 A1 | 7/2003 | Cohen et al. |
| 2003/0149662 A1 | 8/2003 | Shore |
| 2003/0172036 A1 | 9/2003 | Feigenbaum |
| 2003/0172040 A1 | 9/2003 | Kemper et al. |
| 2003/0212595 A1 | 11/2003 | Antonucci |
| 2003/0212601 A1 | 11/2003 | Silva et al. |
| 2003/0212642 A1 | 11/2003 | Weller et al. |
| 2003/0220835 A1 | 11/2003 | Barnes, Jr. |
| 2003/0225618 A1 | 12/2003 | Hessburg et al. |
| 2003/0229588 A1 | 12/2003 | Falk et al. |
| 2003/0230630 A1 | 12/2003 | Whipple et al. |
| 2003/0233292 A1 | 12/2003 | Richey et al. |
| 2004/0019522 A1 | 1/2004 | Bortolin et al. |
| 2004/0030601 A1 | 2/2004 | Pond et al. |
| 2004/0038690 A1* | 2/2004 | Lee et al. ............ 455/466 |
| 2004/0044621 A1 | 3/2004 | Huang et al. |
| 2004/0049455 A1 | 3/2004 | Mohsenzadeh |
| 2004/0050922 A1 | 3/2004 | Gauthier et al. |
| 2004/0054575 A1 | 3/2004 | Marshall |
| 2004/0054581 A1 | 3/2004 | Redford et al. |
| 2004/0054590 A1 | 3/2004 | Redford et al. |
| 2004/0054591 A1 | 3/2004 | Spaeth et al. |
| 2004/0063494 A1 | 4/2004 | Oram et al. |
| 2004/0064406 A1 | 4/2004 | Yates et al. |
| 2004/0078243 A1 | 4/2004 | Fisher |
| 2004/0117254 A1 | 6/2004 | Nemirofsky et al. |
| 2004/0133653 A1 | 7/2004 | Defosse et al. |
| 2004/0139021 A1 | 7/2004 | Reed et al. |
| 2004/0148224 A1 | 7/2004 | Gauthier et al. |
| 2004/0153715 A1 | 8/2004 | Spaeth et al. |
| 2004/0186770 A1 | 9/2004 | Pettit et al. |
| 2004/0199470 A1 | 10/2004 | Ferry, Jr. et al. |
| 2004/0220964 A1 | 11/2004 | Shiftan et al. |
| 2004/0243519 A1 | 12/2004 | Perttila et al. |
| 2004/0254848 A1 | 12/2004 | Golan et al. |
| 2004/0260653 A1 | 12/2004 | Tsuei et al. |
| 2004/0267618 A1 | 12/2004 | Judicibus et al. |
| 2005/0021456 A1 | 1/2005 | Steele et al. |
| 2005/0029344 A1 | 2/2005 | Davis |
| 2005/0033688 A1 | 2/2005 | Peart et al. |
| 2005/0035847 A1 | 2/2005 | Bonalle et al. |
| 2005/0036611 A1 | 2/2005 | Seaton, Jr. et al. |
| 2005/0045718 A1 | 3/2005 | Bortolin et al. |
| 2005/0058427 A1 | 3/2005 | Nguyen et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0075958 A1 | 4/2005 | Gonzalez |
| 2005/0097473 A1 | 5/2005 | Malik et al. |
| 2005/0102233 A1 | 5/2005 | Park et al. |
| 2005/0102234 A1 | 5/2005 | Devine |
| 2005/0121506 A1 | 6/2005 | Gauthier et al. |
| 2005/0131838 A1 | 6/2005 | Woodward |
| 2005/0149455 A1 | 7/2005 | Bruesewitz et al. |
| 2005/0154674 A1 | 7/2005 | Nicholls et al. |
| 2005/0165864 A1 | 7/2005 | Martino |
| 2005/0171898 A1 | 8/2005 | Bishop et al. |
| 2005/0177510 A1 | 8/2005 | Hilt et al. |
| 2005/0187873 A1 | 8/2005 | Labrou et al. |
| 2005/0199714 A1 | 9/2005 | Brandt et al. |
| 2005/0203856 A1 | 9/2005 | Russell |
| 2005/0210387 A1 | 9/2005 | Alagappan et al. |
| 2005/0213766 A1 | 9/2005 | Goss |
| 2005/0219061 A1 | 10/2005 | Lai et al. |
| 2005/0222933 A1 | 10/2005 | Wesby |
| 2005/0222949 A1 | 10/2005 | Inotay et al. |
| 2005/0283416 A1 | 12/2005 | Reid et al. |
| 2005/0283430 A1 | 12/2005 | Reid et al. |
| 2005/0283431 A1 | 12/2005 | Reid et al. |
| 2005/0283432 A1 | 12/2005 | Reid et al. |
| 2005/0283433 A1 | 12/2005 | Reid et al. |
| 2006/0053056 A1 | 3/2006 | Alspach-Goss et al. |
| 2006/0059110 A1 | 3/2006 | Madhok et al. |
| 2006/0080243 A1 | 4/2006 | Kemper et al. |
| 2006/0085260 A1 | 4/2006 | Yamagishi |
| 2006/0111967 A1 | 5/2006 | Forbes |
| 2006/0155644 A1 | 7/2006 | Reid et al. |
| 2006/0163345 A1 | 7/2006 | Myers et al. |
| 2006/0178957 A1 | 8/2006 | LeClaire |
| 2006/0179007 A1 | 8/2006 | Davis |
| 2006/0202025 A1 | 9/2006 | Calabrese et al. |
| 2006/0206376 A1 | 9/2006 | Gibbs et al. |
| 2006/0218086 A1 | 9/2006 | Campbell et al. |
| 2006/0224449 A1 | 10/2006 | Byerley et al. |
| 2006/0247981 A1 | 11/2006 | Singh et al. |
| 2006/0248007 A1 | 11/2006 | Hofer et al. |
| 2006/0253390 A1 | 11/2006 | McCarthy et al. |
| 2006/0270421 A1 | 11/2006 | Phillips et al. |
| 2006/0273163 A1 | 12/2006 | Gusler et al. |
| 2006/0282382 A1 | 12/2006 | Balasubramanian et al. |
| 2006/0290501 A1 | 12/2006 | Hammad et al. |

(56) References Cited

U.S. PATENT DOCUMENTS

| | | |
|---|---|---|
| 2006/0293027 A1 | 12/2006 | Hammad et al. |
| 2007/0001000 A1 | 1/2007 | Nguyen et al. |
| 2007/0001001 A1 | 1/2007 | Myers et al. |
| 2007/0005492 A1 | 1/2007 | Kim |
| 2007/0005613 A1 | 1/2007 | Singh et al. |
| 2007/0005774 A1 | 1/2007 | Singh et al. |
| 2007/0012764 A1 | 1/2007 | Bortolin et al. |
| 2007/0017970 A1 | 1/2007 | Gauthier et al. |
| 2007/0022058 A1 | 1/2007 | Labrou et al. |
| 2007/0034679 A1 | 2/2007 | Gauthier et al. |
| 2007/0055597 A1 | 3/2007 | Patel et al. |
| 2007/0055630 A1 | 3/2007 | Gauthier et al. |
| 2007/0057034 A1 | 3/2007 | Gauthier et al. |
| 2007/0057051 A1 | 3/2007 | Bortolin et al. |
| 2007/0078761 A1 | 4/2007 | Kagan et al. |
| 2007/0083465 A1 | 4/2007 | Ciurea et al. |
| 2007/0100691 A1 | 5/2007 | Patterson |
| 2007/0125842 A1 | 6/2007 | Antoo et al. |
| 2007/0150387 A1 | 6/2007 | Seubert et al. |
| 2007/0156436 A1 | 7/2007 | Fisher et al. |
| 2007/0194104 A1 | 8/2007 | Fukuda |
| 2007/0194113 A1 | 8/2007 | Esplin et al. |
| 2007/0203836 A1 | 8/2007 | Dodin |
| 2007/0205270 A1 | 9/2007 | Kemper et al. |
| 2007/0241189 A1 | 10/2007 | Slavin et al. |
| 2007/0243856 A1 | 10/2007 | Fougnies et al. |
| 2007/0244811 A1 | 10/2007 | Tumminaro |
| 2007/0250380 A1 | 10/2007 | Mankoff |
| 2007/0276764 A1 | 11/2007 | Mann |
| 2007/0288373 A1 | 12/2007 | Wilkes |
| 2008/0003987 A1 | 1/2008 | Mechaley |
| 2008/0006685 A1 | 1/2008 | Rackley, III et al. |
| 2008/0010193 A1 | 1/2008 | Rackley, III et al. |
| 2008/0021784 A1 | 1/2008 | Hessburg et al. |
| 2008/0033880 A1 | 2/2008 | Fiebiger et al. |
| 2008/0040265 A1 | 2/2008 | Rackley, III et al. |
| 2008/0058014 A1 | 3/2008 | Khan et al. |
| 2008/0064383 A1 | 3/2008 | Nath et al. |
| 2008/0114657 A1 | 5/2008 | Forzley |
| 2008/0116264 A1 | 5/2008 | Hammad et al. |
| 2008/0118069 A1 | 5/2008 | Yang |
| 2008/0120182 A1 | 5/2008 | Arnold et al. |
| 2008/0126145 A1 | 5/2008 | Rackley, III et al. |
| 2008/0133366 A1 | 6/2008 | Evans et al. |
| 2008/0133409 A1 | 6/2008 | Eastley et al. |
| 2008/0147546 A1 | 6/2008 | Weichselbaumer et al. |
| 2008/0154727 A1 | 6/2008 | Carlson |
| 2008/0154735 A1 | 6/2008 | Carlson |
| 2008/0154772 A1 | 6/2008 | Carlson |
| 2008/0163257 A1 | 7/2008 | Carlson |
| 2008/0167017 A1 | 7/2008 | Wentker et al. |
| 2008/0167988 A1 | 7/2008 | Sun et al. |
| 2008/0167991 A1 | 7/2008 | Carlson et al. |
| 2008/0183480 A1 | 7/2008 | Carlson |
| 2008/0201226 A1 | 8/2008 | Carlson |
| 2008/0208681 A1 | 8/2008 | Hammad et al. |
| 2008/0208762 A1 | 8/2008 | Arthur et al. |
| 2008/0228611 A1 | 9/2008 | Lilly et al. |
| 2008/0270246 A1 | 10/2008 | Chen |
| 2008/0288404 A1 | 11/2008 | Pirzadeh et al. |
| 2008/0300973 A1 | 12/2008 | DeWitt et al. |
| 2008/0319843 A1 | 12/2008 | Moser et al. |
| 2009/0012886 A1 | 1/2009 | Allin et al. |
| 2009/0018954 A1 | 1/2009 | Roberts |
| 2009/0076896 A1 | 3/2009 | DeWitt et al. |
| 2009/0076925 A1 | 3/2009 | DeWitt et al. |
| 2009/0078777 A1 | 3/2009 | Granucci et al. |
| 2009/0083159 A1 | 3/2009 | Maw |
| 2009/0084840 A1 | 4/2009 | Williams et al. |
| 2009/0094125 A1 | 4/2009 | Killian et al. |
| 2009/0098825 A1* | 4/2009 | Huomo et al. ............... 455/41.1 |
| 2009/0112721 A1 | 4/2009 | Hammad et al. |
| 2009/0112765 A1 | 4/2009 | Skowronek |
| 2009/0119170 A1 | 5/2009 | Hammad et al. |
| 2009/0143104 A1* | 6/2009 | Loh ..................... G06Q 20/32 455/558 |
| 2009/0182634 A1 | 7/2009 | Park et al. |
| 2009/0193253 A1 | 7/2009 | Falk et al. |
| 2009/0202081 A1 | 8/2009 | Hammad et al. |
| 2009/0314840 A1 | 12/2009 | Granucci et al. |
| 2010/0042540 A1 | 2/2010 | Graves et al. |
| 2010/0057620 A1 | 3/2010 | Li et al. |
| 2010/0211498 A1 | 8/2010 | Aabye et al. |
| 2010/0211507 A1 | 8/2010 | Aabye et al. |
| 2010/0217709 A1 | 8/2010 | Aabye et al. |
| 2011/0112964 A1 | 5/2011 | Berntsen et al. |
| 2011/0119184 A1 | 5/2011 | Singhal |
| 2011/0161182 A1 | 6/2011 | Racco |
| 2011/0161230 A1 | 6/2011 | Singh |
| 2011/0225075 A1 | 9/2011 | Maw et al. |
| 2011/0276511 A1* | 11/2011 | Rosenberg ............ G06Q 20/20 705/345 |
| 2012/0029990 A1 | 2/2012 | Fisher |
| 2013/0060647 A1 | 3/2013 | Aabye et al. |
| 2013/0060706 A1 | 3/2013 | Aabye et al. |
| 2015/0213560 A1 | 7/2015 | Aabye et al. |

FOREIGN PATENT DOCUMENTS

| | | |
|---|---|---|
| AU | 2015201432 | 4/2015 |
| CA | 2738160 | 3/2010 |
| EP | 1 096 439 A2 | 5/2001 |
| EP | 1 136 961 A1 | 9/2001 |
| EP | 1772832 | 4/2007 |
| EP | 2340519 | 7/2011 |
| EP | 2342679 | 7/2011 |
| EP | 2342679 | 4/2012 |
| EP | 2637131 | 9/2013 |
| GB | 2 348 781 B | 11/2003 |
| HK | 1184584 | 1/2014 |
| IN | 2007CHENP2011 | 2/2011 |
| IN | 2012CHENP2011 | 12/2011 |
| IN | 2016CHENP2011 | 12/2011 |
| KR | 20-0276208 Y1 | 5/2002 |
| KR | 10-0773918 B1 | 11/2007 |
| KR | 10-0914513 B1 | 9/2009 |
| KR | 10-1039696 B1 | 6/2011 |
| KR | 10-1092657 B1 | 12/2011 |
| KR | 10-1138938 B1 | 4/2012 |
| KR | 10-1184865 B1 | 9/2012 |
| KR | 10-1195182 B1 | 10/2012 |
| MX | 2011003056 | 7/2011 |
| MX | 2011003059 | 7/2011 |
| MX | 2011003060 | 7/2011 |
| RU | 2173505 C2 | 9/2001 |
| WO | 96/13814 A1 | 5/1996 |
| WO | 97/12461 A1 | 4/1997 |
| WO | 97/45814 A1 | 12/1997 |
| WO | 99/51038 A2 | 10/1999 |
| WO | 00/03328 A1 | 1/2000 |
| WO | 00/77697 A1 | 12/2000 |
| WO | 2004/077369 A1 | 9/2004 |
| WO | 2005/052869 A1 | 6/2005 |
| WO | 2006/024080 A1 | 3/2006 |
| WO | 2007/145540 A2 | 12/2007 |
| WO | 2008/042302 A2 | 4/2008 |
| WO | 2010033968 | 3/2010 |
| WO | 2010033972 | 3/2010 |

OTHER PUBLICATIONS

Search Report dated Aug. 8, 2013 in European Patent Application No. 13160698, 7 pages.

Proximity Mobile Payments: Leveraging NFC and the Contactless Financial Payments Infrastructure. *A Smart Card Alliance Contactless Payments Council White Paper*. Smart Card Alliance, Sep. 2007. www.smartcardalliance.org.

Extended European Search Report dated Mar. 13, 2012 for EP Patent Application No. 09815372.9, 7 pages.

Non-Final Office Action dated Mar. 30, 2012 for U.S. Appl. No. 12/563,421, 17 pages.

(56) References Cited

OTHER PUBLICATIONS

EP Search Report dated Apr. 10, 2012 in EP 09 815 368.7, 3 pages.
Final Office Action dated Oct. 30, 2012 for U.S. Appl. No. 12/563,421, 16 pages.
Extended European Search Report dated Aug. 14, 2013 for EP Patent Application No. 13160698.0, 10 pages.
Russian Office Action (and English Translation thereof) dated Oct. 16, 2013 in RU 2011131696, 8 pages.
Office Action dated Jan. 10, 2014 in U.S. Appl. No. 12/563,421, 19 pages.
Non-Final Office Action dated Jun. 19, 2014 for U.S. Appl. No. 12/563,430, 47 pages.
Australian Patent Examination dated Jul. 3, 2014 for AU Patent Application No. 2009292926, 3 pages.
Australian Patent Examination dated Jul. 25, 2014 for AU Patent Application No. 2009292922, 4 pages.
Non-Final Office Action dated Aug. 1, 2014 for U.S. Appl. No. 13/662,371, 10 pages.
Russian Office Action dated Aug. 13, 2014 for RU Patent Application No. 2011131696, 9 pages.
Final Office Action dated Sep. 4, 2014 for U.S. Appl. No. 12/563,421, 22 pages.
Non-Final Office Action dated Sep. 4, 2014 for U.S. Appl. No. 12/563,410, 11 pages.
Notice of Allowance dated Oct. 29, 2014 for U.S. Appl. No. 12/563,430, 18 pages.
Australian Patent Examination dated Oct. 29, 2014 for AU Patent Application No. 2009292921, 3 pages.
Final Office Action dated Dec. 26, 2014 for U.S. Appl. No. 12/563,410, 13 pages.
Final Office Action dated Dec. 26, 2014 for U.S. Appl. No. 13/662,371, 14 pages.
Final Office Action dated Jan. 16, 2015 for U.S. Appl. No. 12/563,421, 21 pages.
Australian Patent Examination dated Feb. 3, 2015 for AU Patent Application No. 2009292922, 3 pages.
Introduction to Public Key Infrastructure (PKI), available online at https://web.archive.org/web/20040826082243/http://www.%20articsoft.com/public_key_infrastructure.html, Aug. 26, 2004, 5 pages.
Australian Application No. 2015201432, First Examination Report dated Aug. 8, 2016, 4 pages.
Australian Application No. 2009292922, Fourth Examiner Report dated Jan. 21, 2016, 5 pages.
Australian Application No. 2009292922, Third Examiner Report dated Aug. 27, 2015, 6 pages.
Australian Application No. 2009292926, Notice of Acceptance dated Dec. 5, 2014, 2 pages.
European Application No. 09815368.7, Office Action dated Sep. 25, 2013, 4 pages.
European Application No. 09815372.9, Office Action dated Sep. 25, 2013, 3 pages.
International Application No. PCT/US2009/057791, International Preliminary Report on Patentability dated Mar. 31, 2011, 7 pages.
International Application No. PCT/US2009/057791, International Search Report and Written Opinion dated Nov. 9, 2009, 7 pages.
International Application No. PCT/US2009/057794, International Preliminary Report on Patentability dated Mar. 31, 2011, 8 pages.
International Application No. PCT/US2009/057794, International Search Report and Written Opinion dated Jan. 8, 2010, 11 pages.
International Application No. PCT/US2009/057802, International Preliminary Report on Patentability dated Mar. 31, 2011, 7 pages.
International Application No. PCT/US2009/057802, International Search Report and Written Opinion dated Nov. 19, 2009, 8 pages.
U.S. Appl. No. 12/563,410, Final Office Action dated May 1, 2012, 12 pages.
U.S. Appl. No. 12/563,410, Non-Final Office Action dated Mar. 6, 2014, 16 pages.
U.S. Appl. No. 12/563,410, Non-Final Office Action dated Nov. 28, 2011, 9 pages.
U.S. Appl. No. 12/563,421, Advisory Action dated Apr. 8, 2015, 4 pages.
U.S. Appl. No. 12/563,421, Final Office Action dated Dec. 21, 2015, 19 pages.
U.S. Appl. No. 12/563,421, Restriction Requirement dated Dec. 29, 2011, 6 pages.
U.S. Appl. No. 12/563,430, Final Office Action dated Sep. 26, 2012, 39 pages.
U.S. Appl. No. 12/563,430, Non-Final Office Action dated Mar. 15, 2012, 36 pages.
U.S. Appl. No. 13/662,371, Non-Final Office Action dated Apr. 20, 2015, 14 pages.
U.S. Appl. No. 14/609,343, Non-Final Office Action dated Oct. 26, 2016, 55 pages.
European Office Action dated Mar. 25, 2015 in EP Patent Application No. 13160698.0, 7 pages.
Non-Final Office Action dated Jun. 5, 2015 in U.S. Appl. No. 12/563,421, 22 pages.
Canadian Office Action dated Aug. 4, 2015 in CA Patent Application No. 2,738,160, 3 pages.

* cited by examiner

500

METHOD OF PERFORMING TRANSACTIONS WITH CONTACTLESS PAYMENT DEVICES USING PRE-TAP AND TWO-TAP OPERATIONS

CROSS REFERENCE TO RELATED APPLICATIONS

This application claims priority from U.S. Provisional Patent Application No. 61/099,060, entitled "Contactless Phone With Secret Data", filed Sep. 22, 2008, the contents of which is hereby incorporated in its entirety by reference for all purposes.

BACKGROUND

Embodiments of the present invention are directed to systems, apparatuses and methods for performing payment transactions, and more specifically, to a system and associated apparatus and method for performing payment transactions using a payment device that includes a contactless element (such as an integrated circuit chip embedded in a wireless mobile device) by interacting with a device reader or point of sale terminal using a pre-tap or two-tap process, either individually or in combination. Embodiments of the invention may be used to conduct payment transactions, perform Issuer updates of data stored in a payment device, or enable the configuration of payment device functions or operations, among other possible uses.

Consumer payment devices are used by millions of people worldwide to facilitate various types of commercial transactions. In a typical transaction involving the purchase of a product or service at a merchant location, the payment device is presented at a point of sale terminal ("POS terminal") located at a merchant's place of business. The POS terminal may be a card reader or similar device that is capable of accessing data stored on the payment device, where this data may include identification or authentication data, for example. Data read from the payment device is provided to the merchant's transaction processing system and then to the Acquirer, which is typically a bank or other institution that manages the merchant's account. The data provided to the Acquirer may then be provided to a payment processing network that is in communication with data processors that process the transaction data to determine if the transaction should be authorized by the network, and assist in the clearance and account settlement functions for completed transactions. The authorization decision and clearance and settlement portions of the transaction may also involve communication and/or data transfer between the payment processing network and the bank or institution that issued the payment device to the consumer (known as the Issuer).

Although a consumer payment device may be a credit card or debit card, it may also take the form of a "smart" card or chip. A smart card is generally defined as a pocket-sized card (or other form of portable payment device) that is embedded with a microprocessor and one or more memory chips, or is embedded with one or more memory chips with non-programmable logic. The microprocessor type card typically can implement certain data processing functions, such as to add, delete, or otherwise manipulate information stored in a memory location on the card. In contrast, the memory chip type card (for example, a prepaid phone card) can typically only act as a file to hold data that is manipulated by a card reading device to perform a pre-defined operation, such as debiting a charge from a pre-established balance stored in the memory. Smart cards, unlike magnetic stripe cards (such as standard credit cards), can implement a variety of functions and contain a variety of types of information on the card. Therefore, in some applications they may not require access to a remote database for the purpose of authenticating a consumer or creating a record at the time of a transaction. A smart chip is a semiconductor device that is capable of performing most, if not all, of the functions of a smart card, but may be embedded in another device.

Smart cards or chips come in two general varieties; the contact type and the contactless type. A contact type smart card or chip is one that includes a physical element (e.g., a magnetic stripe, contact pad, etc.) that enables access to the data and functional capabilities of the card, typically via some form of terminal or card reader. In contrast, a contactless smart card or chip is a device that incorporates a means of communicating with a card reader or point of sale terminal without the need for direct physical contact. Thus, such devices may effectively be "swiped" (i.e., enabled to be read by, or otherwise exchange data with another device) by passing them close to a card reader or terminal. Contactless cards or chips typically communicate with a device reader or terminal using RF (radio-frequency) technology, wherein proximity to the reader or terminal enables data transfer between the card or chip and the reader or terminal. Contactless cards have found uses in banking and other applications, where they have the advantage of not requiring removal from a user's wallet or pocket in order to participate in a transaction. A contactless card or chip may be embedded in, or otherwise incorporated into, a mobile device such as a mobile phone or personal digital assistant (PDA). Further, because of the growing interest in such cards, standards have been developed that govern the operation and interfaces for contactless smart cards, such as the ISO 14443 standard.

In a typical payment transaction, data is sent from a point of sale terminal to the Issuer to authenticate a consumer and obtain authorization for the transaction. As part of the authentication or authorization processes, the data may be accessed or processed by other elements of the transaction processing system (e.g., the merchant's Acquirer or a payment processor that is part of a payment processing network). Note that in some cases, authorization for the transaction may be obtained without connecting to the Issuer; this may be permitted by Issuer configured risk management parameters that have been set on the consumer's payment application or payment device. If the proposed transaction is authorized, then the consumer may provide other information to the merchant as part of completing the transaction. The Issuer or data processor may also send data back to the consumer. Such data may include an update to records of the transactions for which the payment device has been used, or to a current balance of an account associated with the device.

An Issuer or payment processor may also desire to configure (or re-configure) a function, operation, or setting of a payment application that is installed on a payment device, such as a mobile device that includes a contactless element. Such an action may include resetting a counter to enable or disable a function, configuring a function or capability of the payment application or payment device, or initiating the execution of a script or application that operates on the payment application, payment device, or transaction data, for example.

An issue for any payment transaction system or process is ease of use by a consumer, as this leads to increased adoption by the consumer and usage of the system, thereby generating more revenue for Merchants and the entities involved in authorizing and processing payment transactions. A consumer typically desires that a transaction be executed with a minimum amount of delay and with minimal burden being placed on the consumer. In addition, if required for a transaction, a consumer desires to be able to locate and activate a payment application on a payment device with relatively little effort in order to initiate the transaction. The concern for minimizing the burden on a consumer is at least partly the result of recognizing that a consumer typically does not want to be inconvenienced by difficulties in attempting to activate a payment application or by having to wait additional time while the transaction processing system carries out data processing or other functions. Thus, in order to satisfy the desires and expectations of consumers, most payment transaction processing systems are designed to require minimal interaction on the part of consumers.

For example, in the case of a transaction that uses a contactless element, a device reader or point of sale terminal is typically expected to be in communication with the contactless element for only a short period of time; for example, enough time for it to be recognized by the reader and to provide data needed to initiate or conduct a portion of the transaction. However, this means that the consumer payment device and device reader or point of sale terminal may not be in communication long enough for an Issuer or payment processor to process the transaction data and provide the processed data to the device reader for transfer to the consumer device. It may also mean that the payment device and device reader or terminal are not in communication when the Issuer or payment processor desires to perform an update to cause a command or function to be executed on the payment device, such as for resetting a counter, configuring a function of the payment application or payment device, etc.

Another issue for a payment transaction system or process in which data or a configuration command or instruction is provided by an Issuer or payment processor involves ensuring that the received data, command, or instruction is from an authorized party, and that the payment device properly associates the received information with the transaction or application to which the information applies.

What is desired is a system, apparatus and method for enabling an Issuer or payment processor to provide a consumer payment device containing a contactless element with transaction data or to initiate an update process, without requiring that a consumer maintain communication between the payment device and a device reader or terminal for an extended period of time. It is also desired to have a system, apparatus and method for enabling the automatic launch of a payment application when a payment device is presented to a device reader or point of sale terminal, where this may include a determination of whether consumer interaction is required before a transaction can be completed. Embodiments of the invention address these problems and other problems individually and collectively.

BRIEF SUMMARY

Embodiments of the present invention are directed to a system, apparatus, and method for using a contactless element (such as a contactless smart chip) as part of a payment transaction. Specifically, embodiments of the present invention are directed to facilitating the transfer of transaction data or transaction records to a memory that is part of the payment device. Embodiments of the present invention may also be used to provide a command or instruction (sometimes referred to as a "script") to the device reader for execution by the reader, or to the payment device for execution by a payment application installed on the device. Such a command or instruction may be used to re-set or configure a function of the payment application or of the payment device. The inventive system, apparatus and method may be implemented using a contactless smart chip and a wireless data transfer element (e.g., an element having a near field communications (NFC) capability or similar short range communications technology, etc.) embedded within a mobile wireless device. The mobile device may be a mobile phone, PDA, MP3 player or the like.

To ensure that any data, commands, or instructions received by the payment device are from an authenticated source and that the received information can be associated with the proper transaction data stored in the payment device, embodiments of the present invention may include use of a cryptogram or other form of security control or identification data. For example, in order to ensure that data provided during an Issuer update process is from an authentic Issuer and that the received data is properly associated with the correct transaction, the payment device may generate a cryptogram and provide that cryptogram to an Issuer as part of a transaction. The Issuer may generate a second cryptogram (either based on the initial cryptogram from the payment device, or by an independent process) and provide the second cryptogram to the payment device as part of any data, command, or instruction sent to the payment device as part of an Issuer update process. The payment device can then use the cryptogram received from the Issuer (along with the initial cryptogram sent to the Issuer, if necessary) to confirm the authenticity of the Issuer and to properly associate the received data with the transaction record to which it applies, where the record is stored in the payment device. The cryptogram(s) may be generated by any suitable method and may be stored in a memory in the payment device and if desired, erased after completion of a transaction.

Embodiments of the invention permit an Issuer or payment processor to provide transaction data and/or transaction records to a payment device that includes a contactless element in a manner that minimizes the impact on a consumer. This is accomplished by introducing a two-tap operation, or a combination of a pre-tap and two-tap operation into the transaction process. The pre-tap or two-tap operation may include a consumer presenting a payment device to a device reader or point of sale terminal one or more times to activate a payment application, or to permit the transfer of data or a command to the payment device either prior to, during, or after a transaction. Some or all of the presentation(s) of the payment device that are part of implementing a pre-tap or two-tap operation may be in addition to, or include, a presentation that is typically used to initiate or perform a payment transaction (where the presentation may function to transfer identification or other authentication data to the device reader or terminal).

In one embodiment, the present invention is directed to a method of conducting a payment transaction, where the method includes detecting the presence of a payment device using a wireless communications technology of a device reader or terminal, receiving data identifying a payment account or consumer associated with the payment device, determining that an interaction with the payment device or a consumer is required prior to performance of the payment transaction, determining that the interaction has been performed, detecting the presentment of the payment device using the wireless communications technology of the device reader or terminal, and performing the payment transaction.

In another embodiment, the present invention is directed to a device reader of point of sale terminal, where the device reader or point of sale terminal includes a processor, a memory, and a set of instructions stored in the memory, which when executed by the processor implement a method to detect the presence of a payment device using a wireless communications technology, receive data identifying a payment account or consumer associated with the payment device, in response to receiving the data, determine that an interaction with the payment device or a consumer is required prior to performance of a payment transaction, determine that the interaction has been performed, detect the presentment of the payment device using the wireless communications technology of the device reader or terminal, and perform the payment transaction.

In yet another embodiment, the present invention is directed to a method of conducting a payment transaction, where the method includes detecting the presence of a payment device using a wireless communications technology of a device reader or terminal, and in response to detecting the presence of the payment device, activating a payment application installed on the payment device.

In yet another embodiment, the present invention is directed to a device reader or point of sale terminal, where the device reader or point of sale terminal includes a processor, a memory, and a set of instructions stored in the memory, which when executed by the processor implement a method to detect the presence of a payment device using a wireless communications technology of a device reader or terminal, and in response to detecting the presence of the payment device, activate a payment application installed on the payment device.

Other objects and advantages of the present invention will be apparent to one of ordinary skill in the art upon review of the detailed description of the present invention and the included figures.

DETAILED DESCRIPTION

Embodiments of the present invention are directed to a system, apparatus, and method for processing payment transactions that are conducted using a mobile payment device that includes a contactless element, such as an integrated circuit chip. Embodiments of the invention enable one or more of the operations of activation of a payment application, transfer of transaction data, updating of account records, setting or re-setting of a payment application counter or register, or transfer or processing of a script, command, or instruction, with these functions being performed with minimal impact on a consumer. This is accomplished by introducing a pre-tap and/or two-tap operation prior to, or as part of, the transaction flow. The result is to expedite the payment transaction process for a consumer using a contactless payment device, while facilitating the ability of an Issuer or payment processor to update transaction records or enable, disable, or otherwise configure a payment application or the consumer device.

Further, to ensure that any data, commands, or instructions received by the payment device are from an authenticated source and that the received information can be associated with the proper transaction data stored in the payment device, embodiments of the present invention may include use of a cryptogram or other form of security control or identification data. For example, the payment device may generate a cryptogram and provide that cryptogram to an Issuer as part of a transaction. The Issuer may generate a second cryptogram (either based on the initial cryptogram from the payment device, or by an independent process) and provide the second cryptogram to the payment device as part of any data, command, or instruction sent to the payment device during an Issuer update process. The payment device can then use the cryptogram received from the Issuer (along with the initial cryptogram sent to the Issuer, if necessary) to confirm the authenticity of the Issuer and to properly associate the received data with the transaction record to which it applies, where that record is stored in the payment device. The cryptogram(s) may be generated by any suitable method and may be stored in a memory in the payment device and if desired, erased after completion of a transaction for which the cryptogram was generated.

The present invention is typically implemented in the context of a payment transaction; therefore prior to describing one or more embodiments of the invention in greater detail, a brief discussion will be presented of the entities involved in processing and authorizing a payment transaction and their roles in the authorization process.

Figure 1:
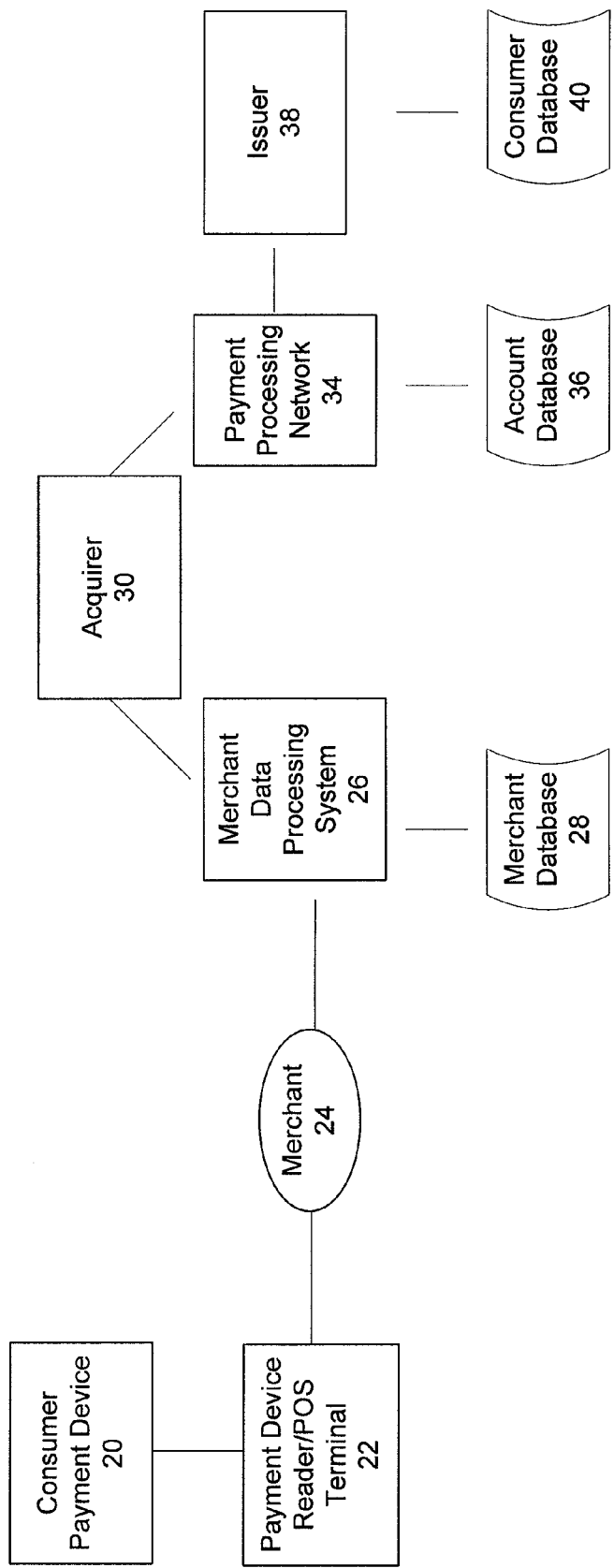
FIG. 1 is a block diagram illustrating a transaction processing system that may be used with some embodiments of the present invention.

FIG. 1 is a block diagram illustrating a transaction processing system that may be used with some embodiments of the present invention. Typically, an electronic payment transaction is authorized if the consumer conducting the transaction is properly authenticated (i.e., their identity and their valid use of a payment account is verified) and if the consumer has sufficient funds or credit to conduct the transaction. Conversely, if there are insufficient funds or credit in the consumer's account, or if the consumer's payment device is on a negative list (e.g., it is indicated as possibly having been stolen), then an electronic payment transaction may not be authorized. In the following description, an "Acquirer" is typically a business entity (e.g., a commercial bank) that has a business relationship with a particular merchant. An "Issuer" is typically a business entity (e.g., a bank) which issues a payment device (such as a credit or debit card) to a consumer. Some entities may perform both Issuer and Acquirer functions.

FIG. 1 illustrates the primary functional elements that are typically involved in processing a payment transaction and in the authorization process for such a transaction. As shown in FIG. 1, in a typical payment transaction, a consumer wishing to purchase a good or service from a merchant uses a portable consumer payment device 20 to provide payment transaction data that may be used as part of a consumer authentication or transaction authorization process. Portable consumer payment device 20 may be a debit card, credit card, smart card, mobile device containing a contactless chip, or other suitable form of device.

The portable consumer payment device is presented to a device reader or point of sale (POS) terminal 22 which is able to access data stored on or within the payment device. The account data (as well as any required consumer data) is communicated to the merchant 24 and ultimately to the merchant's transaction/data processing system 26. As part of the authentication or authorization process performed by the merchant, merchant transaction processing system 26 may access merchant database 28, which typically stores data regarding the customer/consumer (as the result of a registration process with the merchant, for example), the consumer's payment device, and the consumer's transaction history with the merchant. Merchant transaction processing system 26 typically communicates with Acquirer 30 (which manages the merchant's accounts) as part of the overall authentication or authorization process. Merchant transaction processing system 26 and/or Acquirer 30 provide data to Payment Processing Network 34, which among other functions, participates in the clearance and settlement processes that are part of the overall transaction processing. Communication and data transfer between Merchant transaction processing system 26 and Payment Processing Network 34 is typically by means of an intermediary, such as Acquirer 30. As part of the consumer authentication or transaction authorization process, Payment Processing Network 34 may access account database 36, which typically contains information regarding the consumer's account payment history, chargeback or transaction dispute history, credit worthiness, etc. Payment Processing Network 34 communicates with Issuer 38 as part of the authentication or authorization process, where Issuer 38 is the entity that issued the payment device to the consumer and manages the consumer's account. Customer or consumer account data is typically stored in customer/consumer database 40 which may be accessed by Issuer 38 as part of the authentication, authorization or account management processes. Note that instead of, or in addition to being stored in account database 36, consumer account data may be included in, or otherwise part of customer/consumer database 40.

In standard operation, an authorization request message is created during a consumer purchase of a good or service at a point of sale (POS) using a portable consumer payment device. In some embodiments, the portable consumer payment device may be a wireless phone or personal digital assistant that incorporates a contactless card or chip. The contactless card or chip may communicate with the point of sale terminal using a near field communications (NFC) capability. The authorization request message is typically sent from the device reader/POS terminal 22 through the merchant's data processing system 26 to the merchant's Acquirer 30, to a payment processing network 34, and then to an Issuer 38. An "authorization request message" can include a request for authorization to conduct an electronic payment transaction and data relevant to determining if the request should be granted. For example, it may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent unauthorized access to account or transaction data.

After the Issuer receives the authorization request message, the Issuer determines if the transaction should be authorized and sends an authorization response message back to the payment processing network to indicate whether or not the current transaction is authorized. The payment processing system then forwards the authorization response message to the Acquirer. The Acquirer then sends the response message to the Merchant. The Merchant is thus made aware of whether the Issuer has authorized the transaction, and hence whether the transaction can be completed.

At a later time, a clearance and settlement process may be conducted by elements of the payment/transaction processing system depicted in FIG. 1. A clearance process involves exchanging financial details between an Acquirer and an Issuer to facilitate posting a transaction to a consumer's account and reconciling the consumer's settlement position. Clearance and settlement can occur simultaneously or as separate processes.

Payment Processing Network 34 may include data processing subsystems, networks, and other means of implementing operations used to support and deliver authorization services, exception file services, and clearing and settlement services for payment transactions. An exemplary Payment Processing Network may include VisaNet. Payment Processing Networks such as VisaNet are able to process credit card transactions, debit card transactions, and other types of commercial transactions. VisaNet, in particular, includes a VIP system (Visa Integrated Payments system) which processes transaction authorization requests and a Base II system which performs transaction clearing and settlement services.

Payment Processing Network 34 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment Processing Network 34 may use any suitable combination of wired or wireless networks, including the Internet, to permit communication and data transfer between network elements. Among other functions, Payment Processing Network 34 may be responsible for ensuring that a consumer is authorized to conduct a transaction (via an authentication process), confirm the identity of a party to a transaction (e.g., via receipt of a personal identification number), confirm a sufficient balance or credit line to permit a purchase, or reconcile the amount of a purchase with the consumer's account (via entering a record of the transaction amount, date, etc.).

Consumer payment device 20 may take one of many suitable forms. As mentioned, the portable consumer device can be a mobile device that incorporates a contactless element such as a chip for storing payment data (e.g., a BIN number, account number, etc.) and a near field communications (NFC) data transfer element such as an antenna, a light emitting diode, a laser, etc. The portable consumer device may also include a keychain device (such as the Speedpass™ commercially available from Exxon-Mobil Corp.), etc. The device containing the contactless card or chip, or other data storage element may be a cellular (mobile) phone, personal digital assistant (PDA), pager, transponder, or the like. The portable consumer device may also incorporate the ability to perform debit functions (e.g., a debit card), credit functions (e.g., a credit card), or stored value functions (e.g., a stored value or prepaid card).

In embodiments of the invention that include a contactless element (e.g., a contactless chip and near field communications data transfer element) embedded within a wireless mobile phone or similar device, the contactless element can communicate with a Merchant's device reader or point of sale terminal using a short range communication method, such as a near field communications (NFC) capability. Examples of such NFC technologies or similar short range communications technologies include ISO standard 14443, RFID, Bluetooth™ and Infra-red communications methods.

Figure 2:
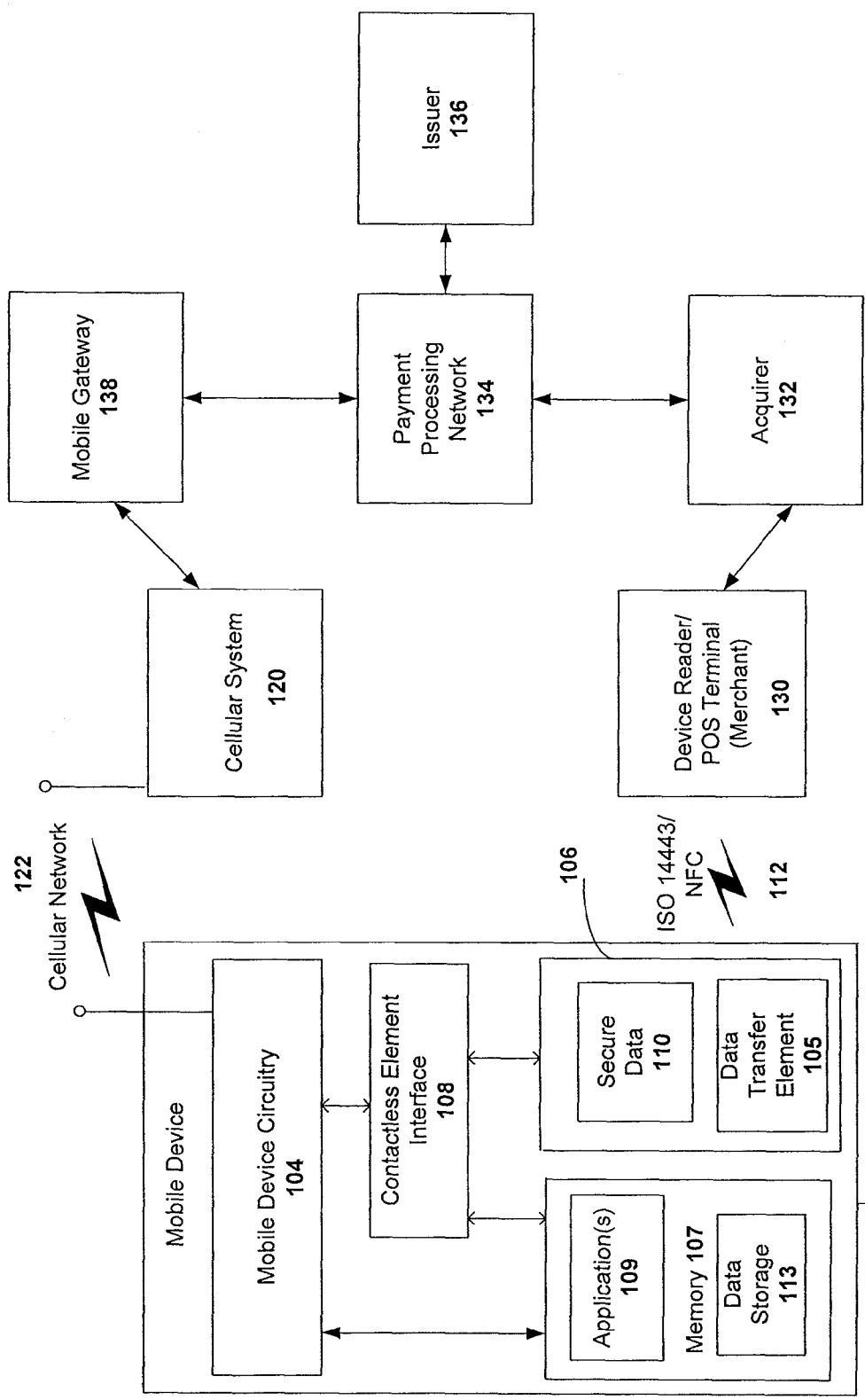
FIG. 2 is a functional block diagram illustrating the primary components of a system for initiating or facilitating a payment transaction using a contactless element contained within a mobile device and a pre-tap and/or two-tap operation, in accordance with some embodiments of the present invention.

FIG. 2 is a functional block diagram illustrating the primary components of a system 100 for initiating or facilitating a payment transaction using a contactless element contained within a mobile device and a pre-tap or two-tap operation, in accordance with some embodiments of the present invention. As shown in FIG. 2, system 100 includes a mobile device 102 having wireless communications capabilities 122. Mobile device 102 may be a wireless mobile telephone, PDA, laptop computer, pager, etc. In a typical embodiment, mobile device 102 is a cell phone, although as noted, implementation of the present invention is not limited to this embodiment as the mobile device that functions as a payment device may take any suitable form convenient for use by a consumer. Naturally, if the mobile device is not a cell phone or similar form of wireless communications device, then the mobile device may not be capable of communication using a wireless or cellular network. In the case of a cell phone as the mobile device 102, the device includes mobile device (cell phone) circuitry 104 that enables certain of the telephony functions. Among other functions, mobile device circuitry 104 enables mobile device 102 to communicate wirelessly with cellular system (i.e., a wireless carrier) 120 via cellular network 122.

Mobile device 102 further includes a contactless element 106, typically implemented in the form of a semiconductor chip. Contactless element 106 may include a secure data storage element 110, although secure data storage element 110 may also be implemented as a separate element from contactless element 106. Contactless element 106 includes a near field communications (NFC) data transfer (e.g., data transmission) element 105, such as an antenna or transducer. As will be described, the near field communications capability permits a device reader or point of sale terminal to exchange data with (or perform operations on) contactless element 106 as part of, or in preparation for, a payment transaction. In some embodiments, contactless element 106 may be embedded within and integrated with the elements of mobile device 102. In such a case, data or control instructions may optionally be transmitted via cellular network 122 and be exchanged with, or applied to, contactless element 106 by means of contactless element interface 108. In that situation, contactless element interface 108 functions to permit the exchange of data and/or control instructions between mobile device circuitry 104 (and hence the cellular network) and contactless element 106. Thus, contactless element 106 may include data storage capability in the form of a memory or secure data storage 110 that may be accessed via a near field communications capability or interface 108 to permit the implementation of data read, write, and erase functions, for example.

Secure data storage 110 may be used by mobile device 102 to store operating parameters or other data utilized in the operation of the device. Secure data storage 110 may also be used to store other data for which enhanced security is desired, for example, transaction data, personal account data, identification data, authentication data, access control data for an application or device function, etc. As mentioned, secure data storage 110 may be implemented in the form of a chip that is separate and apart from contactless element 106, or alternatively, may be a section of memory in a chip that forms part of contactless element 106. Note also that the secure data storage and/or contactless element contained within the mobile device may be a removable element or may be integrated within the mobile device. Examples of removable elements include SIM cards, flash memory cards, and other suitable devices.

Mobile device 102 may also include one or more applications 109, where applications 109 are implemented in the form of one or more of software, firmware, or hardware. Applications 109 are used to implement various functions desired by a consumer, where such functions may include, but are not limited to, eCommerce transaction operations, payment transaction operations, etc. Typically, applications 109 represent processes or operations that are dedicated to a specific function that provides added value for the consumer and which are not part of the standard operation of the device (i.e., not part of enabling the standard telephony functions, for example). As shown in the figure, applications 109 may exchange data with secure data storage 110 (via contactless element interface 108) and may also be capable of exchanging data with mobile device circuitry 104. A typical application 109 for the purposes of the present invention is a payment application that enables a consumer to make a payment for a transaction, where the transaction is wholly or partially conducted using the mobile device. In such an example, secure data storage 110 may contain authentication data, consumer identification data, transaction record data, account balance data, etc. Applications 109 are typically stored as a set of executable instructions in memory 107, which may also include data storage 113. A processor accesses memory 107 to load and unload the instructions and data as needed to execute the instructions to perform the functions of the applications.

Contactless element 106 is capable of transferring and receiving data using data transfer element 105 which implements a near field communications capability 112, typically in accordance with a standardized protocol or data transfer mechanism (identified as ISO 14443/NFC in the figure). Near field communications capability 112 is a short-range communications capability, such as RFID, Bluetooth™, infra-red, or other data transfer capability that can be used to exchange data between the mobile device 102 and a device reader or point of sale terminal 130, which is typically located at a Merchant's place of business. Thus, in some embodiments, mobile device 102 is capable of communicating and transferring data and/or control instructions via both cellular network 122 and near field communications capability 112, although as noted, communications and data transfer by means of the cellular network is not required in order to implement some embodiments of the present invention.

System 100 further includes Acquirer 132 which is in communication with Merchant or with Merchant's device reader or point of sale terminal 130. Acquirer 132 is in communication with Payment Processing Network 134 and as was described, may exchange data with Payment Processing Network 134 as part of the transaction authorization process. Payment Processing Network 134 is also in communication with Issuer 136. As was described, Issuer 136 may exchange data with Payment Processing Network 134 as part of an authentication, transaction authorization, or transaction reconciliation process.

System 100 may also include Mobile Gateway 138, which is capable of coupling the cellular (wireless) network or system to a second network (typically a wireline network such as the Internet) and enabling the transfer of data between the networks. Mobile Gateway 138 may perform data processing operations as needed to permit the efficient transfer of data between the two types of networks, including, but not limited to, data reformatting or other processing to take into account differences in network protocols. Mobile Gateway 138 may also perform data processing operations to enable more efficient data transfer between the networks and devices coupled to each type of network, such as for purposes of improving the ability of a consumer to utilize the received data on a mobile device. As shown in the figure, in some embodiments, Mobile Gateway 138 is coupled to Payment Processing Network 134, which is coupled to Acquirer 130. Note that other embodiments are possible, such as where Mobile Gateway 138 is coupled to Issuer 136, as well as where Acquirer 130 is coupled to Issuer 136. Similarly, Issuer 136 may include the capability of functioning as Mobile Gateway 138.

Inventive system 100 provides an efficient way for a consumer to conduct a payment transaction using a contactless element. As will be described, by using the near field communications capability (or a similar short-range data transfer technology) and a pre-tap process, two-tap process, or a combination of the two processes, a consumer may conduct a contactless payment transaction in a way that has a minimal impact and imposes a minimal burden on the consumer. Embodiments of the present invention facilitate use of a contactless element for payment transactions in a manner that is convenient for the consumer while maintaining the ability of an Issuer or payment processor to update or re-set payment application counters or registers, or to perform another operation on the payment device, payment application, or data stored in the device. Such data may include authentication and account management data, such as transaction records or account balances. For example, a secure data store (e.g., secure data storage 110 or a similar secure memory region that is part of the contactless element or another element of the mobile device) may contain transaction records and a running total of the balance available for a consumer's account. In the case of the contactless element being used with a prepaid card or account, the balance would reflect the remaining amount of money available to a consumer. In the case of the contactless element being used with a credit or debit account, the balance would reflect a remaining credit limit or amount available from the debit account.

Embodiments of the present invention provide a mechanism for efficiently performing a payment transaction using a contactless element by introducing a pre-tap and/or two-tap operation as a prelude to (in the case of a pre-tap), as part of, or after the payment transaction. In some embodiments, a payment device may be presented to a device reader or point of sale (POS) terminal prior to initiation of a transaction, during a transaction, or subsequent to a transaction, with the device being presented in one or more of these situations. Among other uses, presenting the payment device may be used to launch a payment application, enable a transaction, to provide transaction data to the device, or to re-set or configure a function or operation of the payment application or payment device. Note that in the context of the present invention, presenting the device to a device reader or POS terminal will be referred to as a "tap", where a tap includes any action by a consumer that enables communication between the consumer's payment device and a device reader or POS terminal using a near field or short range communications mechanism (including waving the consumer device near a device reader or terminal, placing the consumer device against a device reader or terminal, etc.).

As part of facilitating a payment transaction using a contactless element, a pre-tap operation may be used to activate a payment application, set or re-set a counter or register that is part of a payment application, request that a consumer interaction (or other form of interaction) be performed prior to conducting the payment transaction, or configure or re-configure a payment application or payment device function that is required in order to utilize a payment application. Note that in the context of the present invention, pre-tap refers to a process where a consumer presents their payment device to a device reader or POS terminal, and instead of initiating a payment transaction, the "tap" functions to initiate a process to prepare the payment device for the transaction (such as by activating a payment application), conduct data maintenance functions, request a consumer action, or a similar operation. In the context of the invention, a two-tap process may be used where a first tap is used to perform a payment transaction (for example by transferring consumer identity or authentication data to the device reader or POS terminal), followed by a second tap at a later time to enable data provided by an Issuer or payment processor to be transferred to the payment application or payment device (as may occur as part of an Issuer update operation). Further, a pre-tap or two-tap process may be used to enable execution of a script provided by an Issuer or payment processor, where the script causes execution of a desired function or operation by the payment application, or the application of a desired function or operation by a device reader to the payment device. In some embodiments, an initial pre-tap used in combination with a later single tap presentment of the payment device, or two presentments of the device may be used to enable a payment application or payment device to be properly configured for use in a transaction and to enable the execution of a transaction (or portion thereof) after completion of the configuration operation.

The inventive processes or methods are desirable (and in some use cases may be necessary) when a contactless element is used for a payment transaction. This is because typical payment transaction processing for transactions using a contactless element do not rely on the element being capable of communication with a device reader or POS terminal for more than a brief period of time. This is done to minimize the impact on a consumer and to reduce any inconvenience that might create a disincentive for the consumer to engage in transactions using the device. However, certain operations or functions that might be desired by an Issuer or payment processor as part of initiating or processing a payment transaction are difficult or not realistic to implement unless a consumer presents their payment device for a longer period of time. Embodiments of the present invention provide a way to implement these operations or functions without having a negative impact on the consumer experience, and thus without creating a disincentive for a consumer to utilize the contactless payment device.

Figure 3:
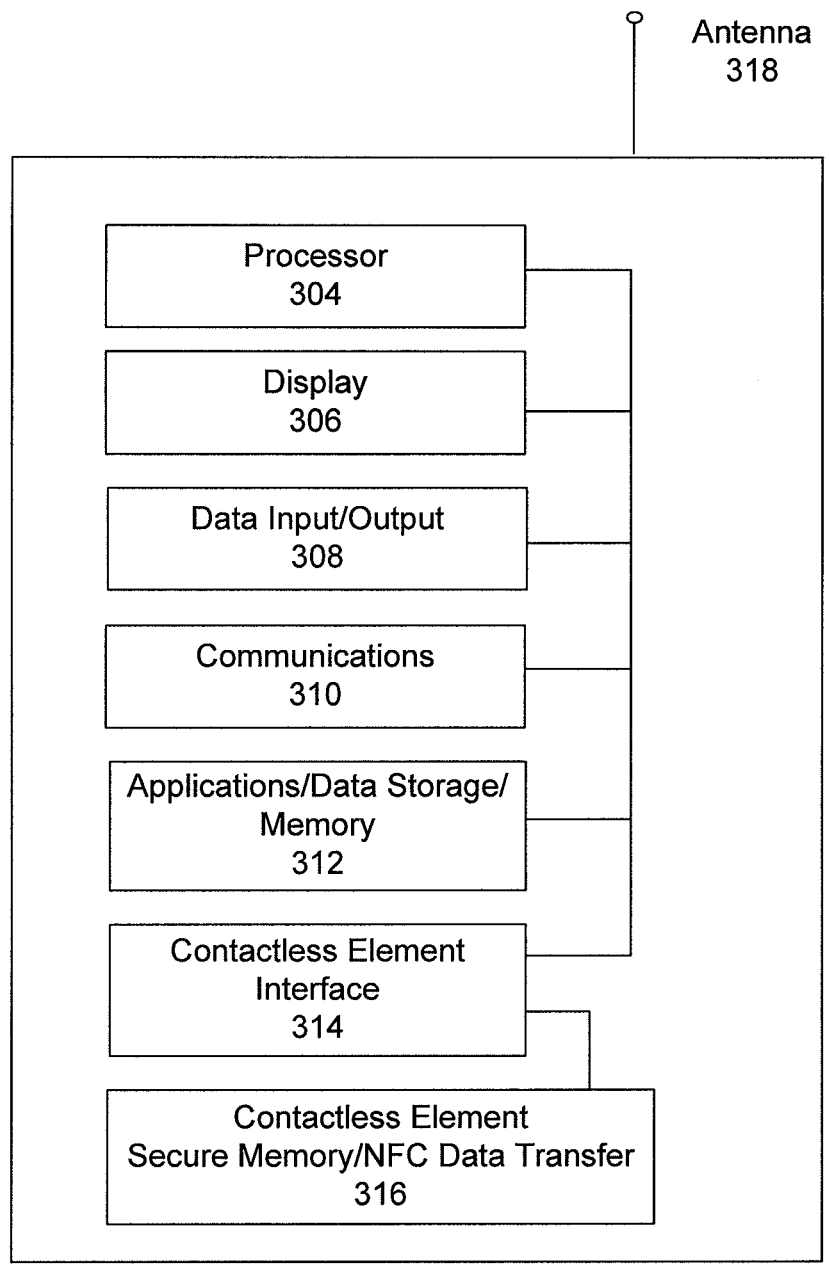
FIG. 3 is a functional block diagram illustrating the primary components of a mobile device, such as a mobile phone that may be used as part of the inventive system and method.

In embodiments of the present invention, the mobile payment device may be any device that includes a contactless element capable of communication and data transfer using a near field communication system. As noted, one example is a mobile wireless phone equipped with a NFC capability or other short range communications technology. FIG. 3 is a functional block diagram illustrating the primary components of a portable consumer device (e.g., element 102 of FIG. 2), such as a mobile phone that may be used as part of the inventive system and method. As illustrated in FIG. 3, mobile device 302 may include circuitry that is used to enable certain telephony and other device functions. The functional elements responsible for enabling those functions may include a processor 304 for executing instructions that implement the functions and operations of the device. Processor 304 may access data storage 312 (or another suitable memory region or element) to retrieve instructions or data used in executing the instructions. Data input/output elements 308 may be used to enable a user to input data (via a microphone or keyboard, for example) or receive output data (via a speaker, for example). Display 306 may also be used to output data to a user. Communications element 310 may be used to enable data transfer between device 302 and a wireless network (via antenna 318, for example) to assist in enabling telephony and data transfer functions. As described with reference to FIG. 2, device 302 may also include contactless element interface 314 to enable data transfer between contactless element 316 and other elements of the device, where contactless element 316 may include a secure memory and a near field communications or other short range communications data transfer element. The contactless element may implement a near field communications or other short range communications capability that enables communication and data transfer between device 302 and a device reader or POS terminal that is part of a payment transaction processing system.

Data storage 312 may be a memory that stores data, and may be in any suitable form including a memory chip, etc. The memory may be used to store data such as user identification or authentication information, user account information, transaction data, etc. Stored financial information may include information such as bank account information, bank identification number (BIN), credit or debit card account number information, account balance information, expiration date, consumer information such as name, date of birth, etc. Note that such data may instead, or also be stored in a secure data storage element, such as secure data storage 110 of FIG. 2 or a similar secure memory that is part of contactless element 316. As described, data storage 312 may also contain instructions which when executed by processor 304 implement operations or processes that are part of the operation of the device or of applications installed on the device.

Figure 4:
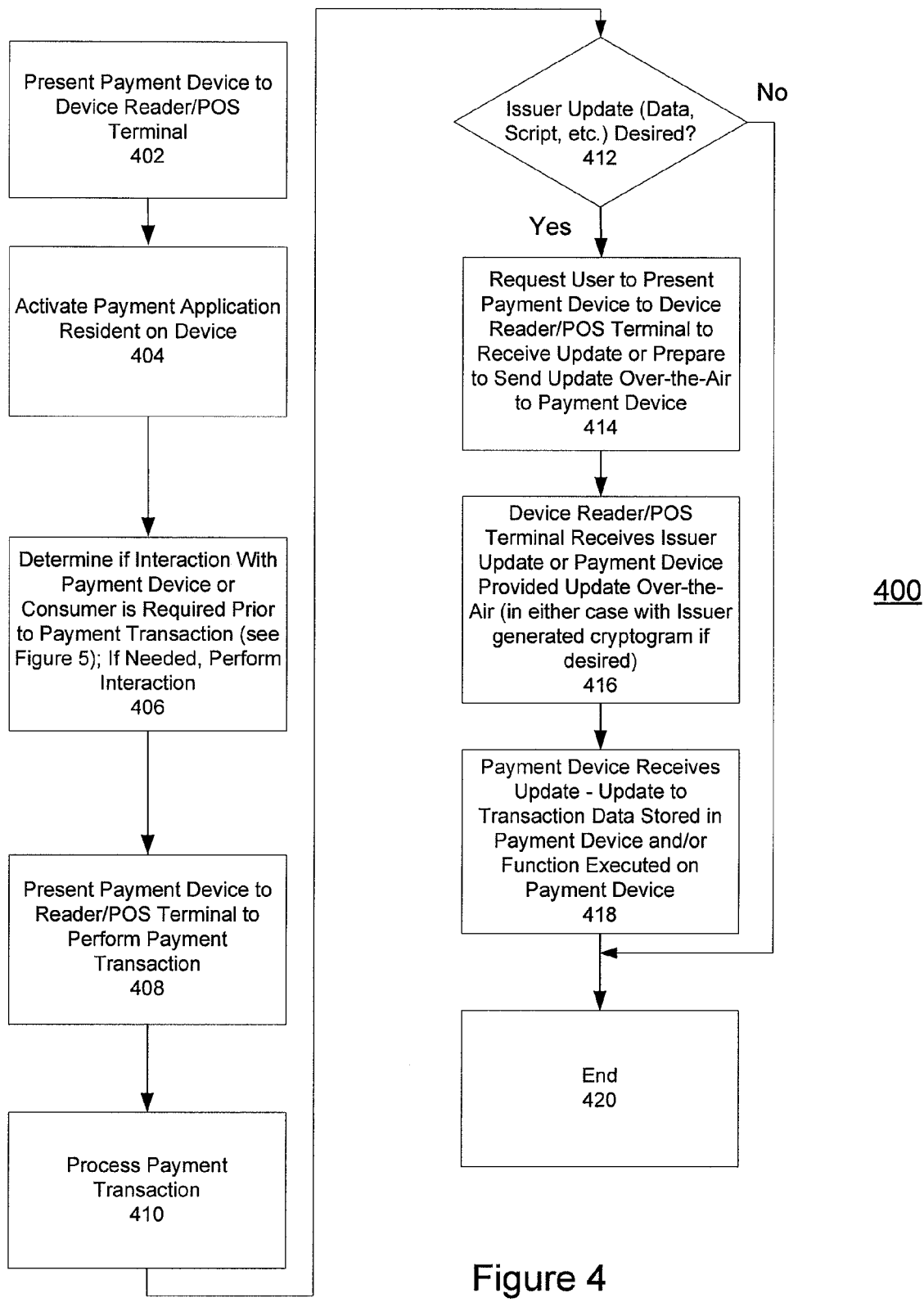
FIG. 4 is a flow chart illustrating an embodiment of the inventive method or process for performing a payment transaction using a contactless element contained within a mobile device by implementing a pre-tap and/or two-tap operation.

FIG. 4 is a flow chart illustrating an embodiment 400 of the inventive method or process for performing a payment transaction using a contactless element contained within a mobile device by implementing a pre-tap and/or two-tap operation. The process steps or stages illustrated in the figure may be implemented as an independent routine or process, or as part of a larger routine or process. Note that each process step or stage depicted may be implemented as an apparatus that includes a processor executing a set of instructions, a method, or a system, among other embodiments.

As shown in the figure, at stage 402 a consumer presents their mobile payment device to a device reader or point of sale (POS) terminal. The mobile device functions as a payment device and includes a contactless element such as a contactless chip. Typically, the consumer presents their mobile device to the device reader or POS terminal as part of providing data to initiate or participate in a payment transaction. However, in accordance with embodiments of the present invention, presentment of the payment device (i.e., a "tap") may serve other functions as well.

In one embodiment, presentation of the payment device may be used to activate or "launch" a payment application installed on the mobile payment device (stage 404). This may be accomplished by causing communication between the device reader or POS terminal and the payment device to trigger activation of the payment application. Such a trigger or activation may occur as the result of the device reader or POS terminal transferring data or a command to the payment device (such as by performing the equivalent of a key or softkey activation), either automatically or in response to a consumer selecting a payment application icon on a device reader or POS terminal screen, for example. Note that the activation of the payment application at this stage is optional, and may be implemented at a different stage in the process.

Further, depending upon the operation of the process depicted in FIG. 4, activation of the payment application may or may not be required in order to implement one or more of the other stages of the overall process. For example, in some embodiments, the payment application may need to be activated in order for certain of the later stages to be implemented, or for consumer authentication data to be transferred to the device reader or POS terminal. Similarly, in some embodiments, the consumer authentication data may be able to be transferred without activation of the payment application, or the need for interaction with the payment device or consumer may be able to be detected in the absence of an activated payment application.

Continuing with the description of FIG. 4, at stage 406 it is determined if interaction (such as a consumer input or action) is required prior to conducting or completing the payment transaction. For example, based on identifying the consumer, the consumer's payment account, etc., it may be determined whether interaction with the consumer's payment device or the consumer is required prior to proceeding with a payment transaction. In some embodiments, this determination may be made according to the process depicted in FIG. 5, or by a similar process. If interaction with the payment device is not required to proceed with a payment transaction, then the payment transaction may be performed; note that in some embodiments, the user may be asked to present the payment device in order to permit performance of the payment transaction, as the first presentment of the payment device (at stage 402) served to activate the payment application (as shown at stage 408). However, if interaction with the payment device or consumer is required before proceeding with a payment transaction, then this interaction is implemented, followed by presenting the payment device to the device reader or point of sale terminal to enable performance of the transaction (stage 408). The required interaction may involve the consumer providing certain data (such as a passcode or other authentication data, or responding to a challenge question), or the performance of an operation on the payment device. Thus, if required, the interaction is performed and the mobile device is re-presented to the device reader or point of sale terminal to perform the payment transaction. As mentioned, and as will be described with reference to FIG. 5, the interaction may involve a consumer providing data (such as a password, etc.), or the payment device or payment application being configured to permit execution of a payment transaction.

After performance of the payment transaction, the payment transaction is processed (stage 410). After the payment transaction is processed, it is determined whether an Issuer update is desired (stage 412). An Issuer update is a process requested or required by an Issuer in which data is provided by the Issuer (such as an update or correction to transaction data, for example), or a script is provided by the Issuer for execution by the device reader, the payment application installed on the payment device, or the payment device. This may occur after the payment transaction has been substantially completed, or may occur at an earlier phase of the payment transaction, such as after a response is received to an authorization request message (in which case the update processing may be required to enable the payment transaction to be completed). If the Issuer update involves the Issuer providing data, then the data may be for the purpose of updating, synchronizing or reconciling an account record stored in the payment device. In such a case, the device reader or POS terminal may be used to transfer the data to the payment device by communication using the near field communications or another short range communications capability. As an alternative, the update may be provided directly to the mobile device using a wireless network (such as cellular network 122 of FIG. 2). If the Issuer update involves communication of a command or script that causes execution of an operation on or by the payment application or payment device, then the command or script may be transferred to the device reader or POS terminal and executed by the device reader or POS terminal, or may be transferred to the payment device by the device reader or over a wireless network to the payment device for execution by the payment device or payment application. The command or script may be for the purpose of setting or re-setting a counter, configuring or re-configuring a function of the payment application or payment device, or updating software on the device, for example.

If an Issuer update is desired using the device reader or POS terminal, then the consumer is requested (e.g., prompted) to present their payment device to the device reader or POS terminal (this is shown as one option at stage 414, with the other option being the preparation for providing an over-the-air update to the payment device). If the Issuer update is to be provided to the payment device using the device reader or POS terminal, then the update is provided to the reader/terminal (stage 416). If the Issuer update is to be provided to the payment device using an over-the-air delivery process, then the update is provided to the wireless or cellular network (via the intermediary of a mobile gateway, for example) and is delivered by that method (stage 416). In the case of delivery to the payment device by the device reader or POS terminal, after presenting the payment device to the reader/terminal, communication is established between the payment device and the reader/terminal, and the Issuer provided data or script may be sent to the payment device using the near field communications capability. The Issuer provided data, command, instruction, script, or other form of information may be accompanied by an Issuer generated cryptogram (as noted at stage 416). The Issuer generated cryptogram may be used to authenticate or otherwise identify the Issuer, and/or to provide a means for associating the received data with the appropriate transaction record that is stored in the payment device. The Issuer provided data, command, instruction, script, or other form of information is received by the payment device and may be used to update transaction data stored in the payment device or cause the execution of a function or operation by the payment application or the payment device, for example (stage 418). In the case of a function or operation being executed, the function or operation may be executed by the device reader or POS terminal, by the payment application, or by the payment device. At this point, provision of the Issuer update will typically be completed and the process will end (stage 420). Note that if an Issuer update is not desired (as determined at stage 412), then control will pass to the end of the process at stage 420.

Figure 5:
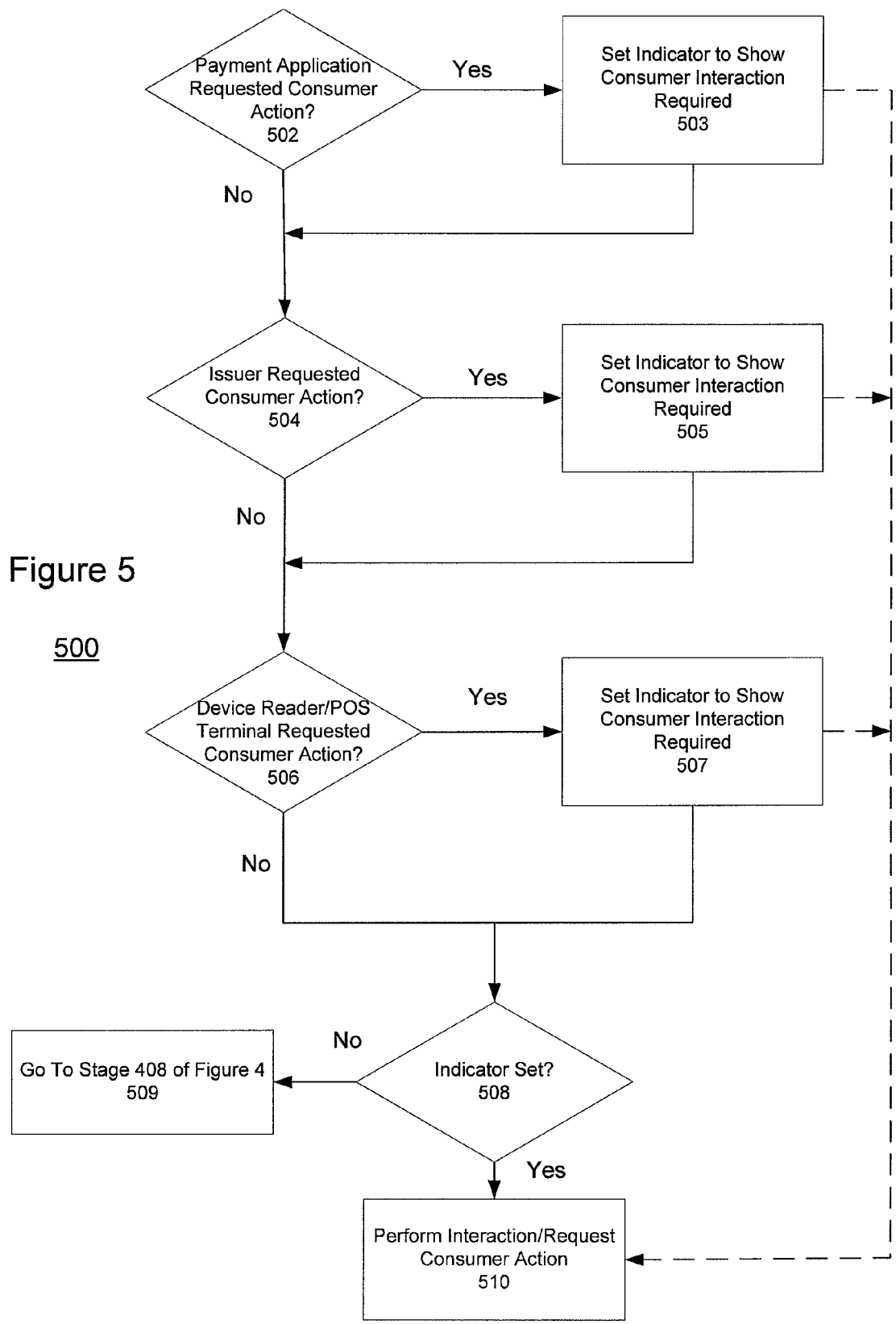
FIG. 5 is a flowchart illustrating a process for determining whether an interaction with a consumer payment device is required prior to the device being used to conduct a payment transaction, in accordance with some embodiments of the present invention.

As noted, if interaction with the consumer's payment device is required prior to conducting a payment transaction, then the interaction is performed prior to performing the payment transaction. A process or method for determining whether an interaction is required is depicted in FIG. 5, which is a flowchart illustrating a process 500 for determining whether an interaction with a consumer payment device is required prior to the device being used to conduct a payment transaction, in accordance with some embodiments of the present invention. It is noted that FIG. 5 depicts an exemplary process for determining if interaction with the payment device is required prior to initiating a payment transaction, and that other, similar processes may be used without departing form the underlying concepts of the invention. In addition, although examples will be provided of the types of interactions or consumer interactions that may be requested or required prior to performance of a payment transaction, it is to be understood that other types of interactions or operations may be requested and fall within the underlying concepts of the invention.

As shown in FIG. 5, the determination of whether interaction with the consumer's payment device is required is made by considering whether at least one of the payment application (or the payment device), the Issuer, or the device reader (or point of sale terminal) has requested or required that the payment device be presented for performing some type of interaction prior to conducting a payment transaction. The process depicted in FIG. 5 operates to determine if one or more of the indicated elements (i.e., the payment application, payment device, device reader, POS terminal, Issuer, etc.) has requested or required presentation of the payment device (in which case an indicator is set indicating that presentation of the payment device is required), or if none of the indicated elements has requested or required presentation of the payment device (in which case an indicator is set indicating that presentation of the payment device is not required, or no indicator is set).

For example, at stage 502 the exemplary process determines if the payment application or payment device has requested a consumer action prior to execution of a payment transaction. Such an action might be requested to provide consumer data such as a consumer input, permit configuration or re-configuration of an application or device function or operation; for example, enabling or disabling a function, transferring data to an Issuer or payment processor, etc. If such a consumer action (which would typically be accomplished by presenting the payment device to a device reader or POS terminal) is required, then control passes to stage 503 where an indicator or flag may be set to indicate that a consumer action is required prior to execution of a payment transaction.

Control then returns to stage 504, where it is determined if an Issuer has requested a consumer action prior to execution of a payment transaction. Note that if the payment application or payment device has not requested a consumer action, then control passes directly to stage 504. An Issuer requested consumer action might be requested to set or re-set a counter that is used to track payment transactions, to enable or disable a function of the payment device, to request an action by a merchant as part of a transaction, etc. As was described with reference to stage 502, if such a consumer action is requested, then control passes to stage 505 where an indicator or flag may be set to indicate that a consumer action is required prior to execution of a payment transaction. Control then returns to stage 506, where it is determined if the device reader or POS terminal has requested a consumer action prior to execution of a payment transaction. Note that if an Issuer has not requested a consumer action, then control passes directly to stage 506. A device reader or POS terminal requested consumer action might be requested to transfer data to the payment device, etc. As was described with reference to stages 502 and 504, if such a consumer action is requested, then control passes to stage 507 where an indicator or flag may be set to indicate that a consumer action is required prior to execution of a payment transaction. Note that if a device reader or point of sale terminal has not requested a consumer action, then control passes directly to stage 508. After completion of the determination(s) of whether a consumer action has been requested, control passes to stage 508 where it is determined if the indicator has been set.

Note that in an alternative embodiment, if any of the elements has requested or required that a consumer action be implemented prior to execution of a payment transaction, then control can be sent directly to stage 510, where the interaction is performed or a consumer action is requested. Similarly, if control has not passed to stage 510, then control may automatically be passed to stage 408 of FIG. 4, as this would indicate that no consumer interaction is required or requested.

The primary function of process 500 depicted in FIG. 5 is to determine if any of the relevant elements of a transaction processing system has requested or required a consumer action prior to the initiation or conducting of a payment transaction (in which case the indicator is set to a specified value), or if instead, none of the relevant elements has requested or required a consumer action prior to conduct of a payment transaction (in which case the indicator is not set, or is set to a different value). If the indicator has been set, then the interaction is requested or performed. If the indicator has not been set (or is set to a value indicating that no consumer action is required), then control passes to stage 408 of FIG. 4.

If it is determined that a consumer action (such as interaction with the consumer's payment device or an input from the consumer) is needed prior to performing a payment transaction, then a consumer may be informed of this and requested to perform the action. Note that the consumer action may take the form of the consumer providing requested data (such as authentication or security data, or a response to a challenge) using a data input mechanism of the payment device, etc. In some cases, the consumer may be requested or prompted to present their payment device to a device reader or POS terminal. In such a situation, the consumer presents their payment device to the reader/terminal, typically by enabling communication between the payment device and the device reader or POS terminal (e.g., by waving, swiping, tapping, or performing a similar action with the payment device). Next, an action or operation may be performed on the payment device, where the action or operation may include one or more of setting or re-setting a counter or indicator, enabling or disabling a function or operation of the payment application or payment device, performing a data processing step on data stored in the device, accessing specified data stored in the device and providing that data to an Issuer, Merchant, or payment processor, etc. Note that in some cases, the presentment of the payment device in response to a request that the consumer perform an action may serve as a "tap" that causes execution or performance of a payment transaction.

Certain of the processes, methods, or operations described with respect to FIGS. 4 and 5 may be implemented in whole or in part by a data processing apparatus resident in a device reader or POS terminal (such as element 130 of FIG. 2), a server communicating with the device reader or POS terminal over a communications network (such as part of the payment processing network 134 of FIG. 2), or by another suitable device. The processes, methods, or operations may be implemented as a set of instructions that are executed by a processor, with the processor being an element of the data processing apparatus or server.

The following is an example of a typical use case or scenario in which embodiments of the inventive system, apparatus and methods may be used. It is noted that the use case is only exemplary, as other use cases or scenarios are possible and will be evident to those of skill in the art. In this example, a consumer wishes to use a mobile payment device to make payment for a good or service at a merchant's location. The mobile payment device may be a mobile phone containing a contactless element, for example. The consumer presents their mobile device to a device reader at the merchant's location, where the device reader uses a near field communications or short range communications mechanism to access data stored in the contactless element. After presentation of the device, a payment application installed on the device may be activated. It is then determined if a consumer interaction is required prior to performing a payment transaction. This determination may be based on data read from the payment device. Whether consumer interaction is required may be determined by any suitable means, such as accessing a database that stores a record of all accounts for which an update or other action is required, or by accessing a database storing an account record for the payment account associated with the payment device, where that record includes an indication that a consumer interaction is required.

If a consumer interaction is required, then the interaction is performed. The consumer then presents the payment device to the device reader or point of sale terminal again. If necessary, the device reader may "read" the consumer's account data and/or the consumer's identification data from the mobile device to enable performance of the payment transaction.

Note that in this scenario, the first presentment of the payment device functions as a "pre-tap" since a function must be performed (e.g., activation of the payment application, configuration of the payment device or payment application) prior to enabling a transaction to be initiated. This is followed by determining if a consumer interaction is required (such as the entry of a passcode to confirm a user's identity). In some cases, determining that a consumer action is required may involve a re-presentation of the payment device to enable a function or operation to be executed. After execution of the required function or performance of the consumer action, the payment transaction may be performed in accordance with its usual procedures, using data that was previously or concurrently provided to authenticate the consumer and perform an authorization process. If necessary, the consumer may need to re-present their payment device to the device reader or POS terminal to cause performance of the payment transaction. After completion of the payment transaction, the consumer may be requested to re-present their mobile payment device to allow an Issuer update or similar operation to be performed. As an alternative, the Issuer update may be provided over another communications channel, such as a wireless or cellular network. The update may be used to transfer updated transaction data, set or re-set a counter, enable or disable a function of the payment device, etc. Thus, in this example, a pre-tap, followed by a "first" tap and a "second" tap are used in combination to activate a payment application, determine that a function or operation needs to be performed on the payment device or payment application (or that a consumer action is required), to execute that function or operation, to perform the transaction, and to provide an update to the transaction data. Note that the pre-tap and a tap to perform the payment transaction may be used with or without another presentment of the payment device (such as to permit an Issuer update) in implementing embodiments of the invention.

Figure 6:
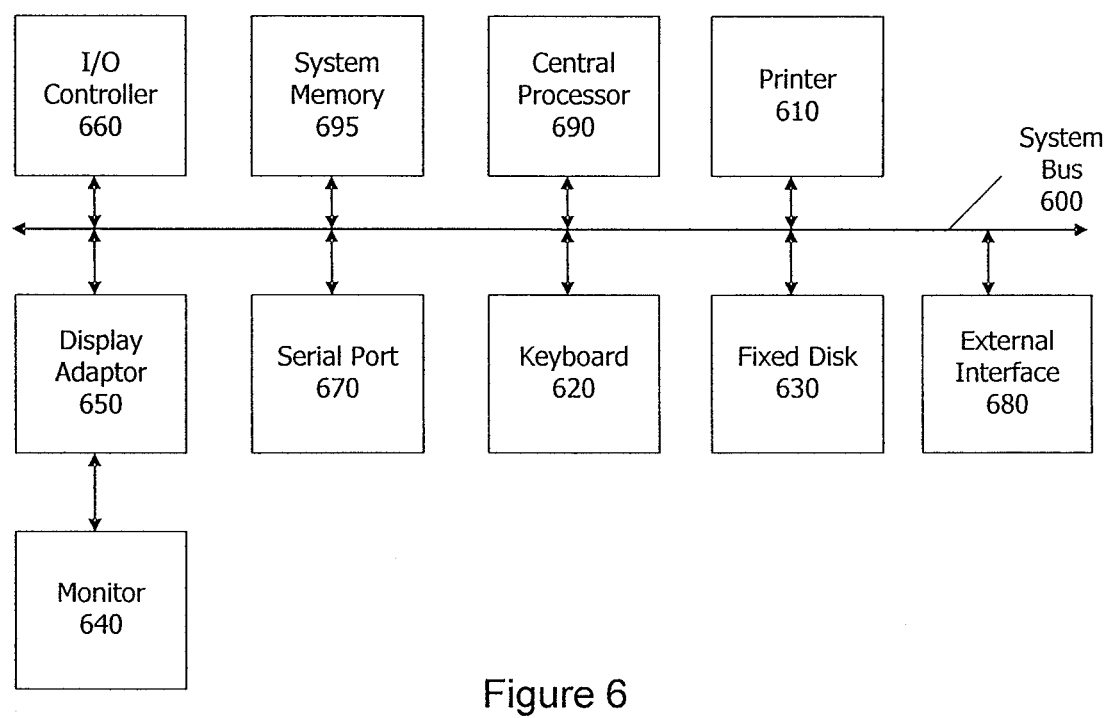
FIG. 6 is a block diagram of an exemplary computing apparatus that may be used to implement an embodiment of the inventive method or process for performing a payment transaction with a contactless payment device using a pre-tap and/or two-tap operation.

FIG. 6 is a block diagram of an exemplary computing apparatus that may be used to implement an embodiment of the inventive method or process for performing a payment transaction with a contactless payment device using a pre-tap and/or two-tap operation. The elements of the computing apparatus illustrated in FIG. 6 may be used to implement the inventive processes, methods, or operations in whole or in part, and may be part of a server or other computing apparatus (e.g., a mobile gateway, an Issuer managed server, etc.). The subsystems shown in FIG. 6 are interconnected via a system bus 600. Additional subsystems such as a printer 610, keyboard 620, fixed disk 630 (or other memory comprising computer readable media), monitor 640, which is coupled to display adapter 650, and others are shown. Peripherals and input/output (I/O) devices, which couple to I/O controller 660, can be connected to the computer system by any number of means known in the art, such as serial port 670. For example, serial port 670 or external interface 680 can be used to connect the computer apparatus to a wide area network such as the Internet, a mouse input device, or a scanner. The interconnection via system bus allows the central processor 690 to communicate with each subsystem and to control the execution of instructions from system memory 695 or the fixed disk 630, as well as the exchange of information between subsystems. The system memory 695 and/or the fixed disk 630 may embody a computer readable medium.

In accordance with embodiments of the present invention, there have been described a system, apparatuses, and methods for enabling use of a mobile payment device that includes a contactless element in executing a payment transaction. The contactless element is embedded within a mobile device that is capable of communication and data transfer using a near field communications capability. One or more "taps" or presentments of the mobile device to a device reader or point of sale terminal may be used to enable a consumer to launch a payment application contained in the payment device, initiate a payment transaction, configure or re-configure a function or operation of the payment device, transfer transaction records to the payment device, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method of conducting a payment transaction, comprising:
    detecting a presence of a payment device using a wireless communications technology of a device reader, wherein the payment device includes a contactless element that communicates and transfers data using wireless communications technology, the presence of the payment device launches a payment application installed on a memory of the payment device;
    transferring, by the device reader, data or a command to the payment device to trigger activation of the payment application installed on the memory of the payment device;
    receiving, by the device reader, data identifying a payment account or consumer associated with the payment device;
    determining, by the device reader, that an interaction with the payment device or the consumer is required prior to a performance of the payment transaction;
    determining, by the device reader, that the interaction has been performed;
    after determining that the interaction has been performed, detecting the presence of the payment device using the wireless communications technology of the device reader;
    performing, by the device reader, the payment transaction; and
    receiving a message from issuer of the payment account after performing the transaction, the message including data to be transmitted to the payment device:
    determining that an interaction with the payment device is required based on the received message from the issuer;
    requesting that the payment device be presented to the device reader; and
    performing an issuer update on the payment device using the device reader, wherein the issuer update transmits the data received from the issuer to the payment device, wherein the issuer update includes identification data to confirm authenticity of the issuer.

2. The method of claim 1, further comprising processing transaction data for the payment transaction.

3. The method of claim 1, wherein determining that an interaction with the payment device or the consumer is required prior to the performance of the payment transaction further comprises accessing a database containing data indicating a status of the payment device, the database maintained by one or more of a merchant, an Acquirer, the Issuer, or an element of a payment processing network.

4. The method of claim 1, wherein performing the issuer update includes one or more of setting a value of a counter, configuring a function of the payment device, enabling or disabling a function of the payment device, or accessing data stored in the payment device.

5. The method of claim 1, wherein the payment device is a mobile phone.

6. The method of claim 1, wherein the identification data includes a cryptogram for confirming the authenticity of the issuer.

7. The method of claim 1, wherein the wireless communications technology is a near field communications technology.

8. The method of claim 1 further comprising, after performing the payment transaction, synchronizing an account record stored in the payment device with an account record stored by the issuer.

9. The method of claim 8 further comprising, after performing the payment transaction, re-setting a counter in the payment device by the issuer.

10. A device reader, comprising:
a processor;
a memory; and
a set of instructions stored in the memory, which when executed by the processor implement a method to:
  detect a presence of a payment device using a wireless communications technology, wherein the payment device includes a contactless element that communicates and transfers data using wireless communications technology, the presence of the payment device launches a payment application installed on a memory of the payment device;
  transfer data or a command to the payment device to trigger activation of the payment application installed on the memory of the payment device;
  receive data identifying a payment account or consumer associated with the payment device;
  in response to receiving the data, determine that an interaction with the payment device or the consumer is required prior to a performance of a payment transaction;
  determine that the interaction has been performed;
  after determining that the interaction has been performed, detect the presence of the payment device using the wireless communications technology of the device reader;
  perform the payment transaction;
  receive a message from issuer of the payment account after performing the transaction, the message including data to be transmitted to the payment device;
  determine that an interaction with the payment device is required based on the received message from the issuer;
  request that the payment device be presented to the device reader; and
  perform an issuer update on the payment device by transmitting the data to the contactless element of the payment device via the wireless communications technology of the device reader, wherein the issuer update includes identification data to confirm authenticity of the issuer.

11. The device reader of claim 10, wherein the issuer update performed on the payment device is one or more of updating a transaction record stored in the payment device or setting a counter value.

12. The device reader of claim 10, wherein the payment device is a mobile phone.

13. The device reader of claim 10, wherein the wireless communications technology is a near field communications technology.

14. A method of conducting a payment transaction, comprising:
detecting a presence of a payment device using a wireless communications technology of a device reader, wherein the payment device includes a contactless element that communicates and transfers data using wireless communications technology;
in response to detecting the presence of the payment device the first time, transferring, by the device reader, data or a command to the payment device to trigger activation of a payment application installed on a memory of the payment device;
after activating the payment application, detecting, by the device reader, the presence of the payment device;
performing, by the device reader, the payment transaction; and
receiving a message from issuer of the payment account after performing the transaction, the message including data to be transmitted to the payment device;
determining that an interaction with the payment device is required based on the received message from the issuer;
requesting that the payment device be presented to the device reader; and
performing an issuer update on the payment device using the device reader, wherein the issuer update transmits the data received from the issuer to the payment device, wherein the issuer update includes identification data to confirm authenticity of the issuer.

15. The method of claim 14, wherein the contactless element is contained in a mobile phone.

16. The method of claim 14, wherein detecting the presence of the payment device further comprises detecting an association between the payment device and a user interface element displayed by the device reader, and the method further comprises activating the payment application identified by the user interface element in response to detecting the presence of the payment device.

17. The method of claim 14, wherein the wireless communications technology is a near field communications technology.

* * * * *

UNITED STATES PATENT AND TRADEMARK OFFICE
CERTIFICATE OF CORRECTION

PATENT NO. : 9,824,355 B2  Page 1 of 1
APPLICATION NO. : 12/563444
DATED : November 21, 2017
INVENTOR(S) : Christian Aabye et al.

It is certified that error appears in the above-identified patent and that said Letters Patent is hereby corrected as shown below:

On the Title Page

In Inventor Item (75) replace "David Wilson, Camberley (GB)" with -- David William Wilson, Camberley (GB) --

In the Claims

Column 20, Line 54 Remove -"payment device:" and insert -- payment device; --

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*